United States Patent
Rudnick et al.

(10) Patent No.: US 8,942,197 B2
(45) Date of Patent: Jan. 27, 2015

(54) MOBILE AD HOC NETWORK WITH DYNAMIC TDMA SLOT ASSIGNMENTS AND RELATED METHODS

(75) Inventors: William Michael Rudnick, Pittsford, NY (US); Ngan-cheung Pun, San Diego, CA (US); David Clark, Brighton, NY (US); Stephanie Clark, legal representative, Brighton, NY (US); Charles Joseph Datz, Victor, NY (US)

(73) Assignee: Harris Corporation, Melbourne, FL (US)

( * ) Notice: Subject to any disclaimer, the term of this patent is extended or adjusted under 35 U.S.C. 154(b) by 554 days.

(21) Appl. No.: 13/279,651

(22) Filed: Oct. 24, 2011

(65) Prior Publication Data

US 2013/0100942 A1     Apr. 25, 2013

(51) Int. Cl.
| | | |
|---|---|---|
| H04W 4/00 | (2009.01) | |
| H04B 7/212 | (2006.01) | |
| H04W 72/12 | (2009.01) | |
| H04B 7/26 | (2006.01) | |
| H04W 84/18 | (2009.01) | |

(52) U.S. Cl.
CPC ........... H04W 72/121 (2013.01); H04B 7/2656 (2013.01); H04W 84/18 (2013.01)
USPC ............................ 370/329; 370/337; 370/254

(58) Field of Classification Search
USPC .......................... 370/320, 337, 347, 348, 350
See application file for complete search history.

(56) References Cited

U.S. PATENT DOCUMENTS

| | | | |
|---|---|---|---|
| 6,804,208 B2 | 10/2004 | Cain et al. ...................... 370/326 |
| 6,807,165 B2 | 10/2004 | Belcea ........................... 370/347 |
| 6,901,064 B2 | 5/2005 | Cain et al. ...................... 370/337 |
| 6,904,032 B2 | 6/2005 | Cain .............................. 370/337 |
| 6,958,986 B2 | 10/2005 | Cain .............................. 370/337 |
| 6,982,987 B2 | 1/2006 | Cain .............................. 370/442 |
| 6,990,350 B2 * | 1/2006 | Davis et al. ................. 455/452.2 |
| 7,031,945 B1 | 4/2006 | Donner ........................... 705/64 |
| 7,496,059 B2 * | 2/2009 | Yoon .............................. 370/311 |
| 7,502,360 B2 * | 3/2009 | Liu et al. ........................ 370/348 |
| 7,561,024 B2 | 7/2009 | Rudnick ................... 340/286.01 |
| 7,590,086 B2 | 9/2009 | Olkkonen et al. ............. 370/328 |
| 7,596,113 B1 * | 9/2009 | Kingston et al. .............. 370/320 |
| 7,606,171 B1 * | 10/2009 | Young et al. .................. 370/254 |
| 7,680,068 B1 * | 3/2010 | Bouis ............................ 370/255 |
| 7,729,321 B2 * | 6/2010 | Liu ............................... 370/337 |
| 7,742,399 B2 | 6/2010 | Pun ............................... 370/218 |
| 7,768,989 B2 * | 8/2010 | Nerses et al. ................. 370/345 |

(Continued)

OTHER PUBLICATIONS

Salonidis et al., "Asynchronous TDMA ad hoc networks: Scheduling and Performance," Communication Networks, 2004, 12 pages.

*Primary Examiner* — Brian O'Connor
(74) *Attorney, Agent, or Firm* — Allen, Dyer, Doppelt, Milbrath & Gilchrist, P.A.

(57) ABSTRACT

A mobile ad hoc network (MANET) may include mobile nodes, each having a wireless transceiver and a controller cooperating with wireless transceiver. The controller may be configured to operate in a geographic area using a time division multiple access (TDMA) protocol and based upon a TDMA epoch including TDMA time slots. The controller may also be configured to dynamically divide into first type mobile nodes and second type mobile nodes based upon a current topologic density in the topologic area relative to a topological density threshold so that each first type mobile node has a periodic TDMA time slot allocated in the TDMA epoch and so that each second type mobile node contends for contention interval TDMA time slots in the TDMA epoch.

15 Claims, 8 Drawing Sheets

(56) References Cited

U.S. PATENT DOCUMENTS

| | | | |
|---|---|---|---|
| 7,768,992 B2 | 8/2010 | Pun | 370/347 |
| 7,773,575 B2 | 8/2010 | Rudnick | 370/347 |
| 7,894,416 B2 | 2/2011 | Rudnick et al. | 370/347 |
| 8,199,677 B1* | 6/2012 | Amis et al. | 370/255 |
| 8,218,522 B2* | 7/2012 | Sy et al. | 370/345 |
| 8,325,702 B2* | 12/2012 | Michaels | 370/347 |
| 8,644,213 B2* | 2/2014 | Park | 370/322 |
| 8,730,838 B2* | 5/2014 | Liang et al. | 370/254 |
| 2003/0031146 A1* | 2/2003 | Sugaya | 370/336 |
| 2005/0141451 A1* | 6/2005 | Yoon et al. | 370/329 |
| 2008/0008138 A1 | 1/2008 | Pun | 370/338 |
| 2008/0019328 A1 | 1/2008 | Rudnick | 370/337 |
| 2008/0165745 A1 | 7/2008 | Rudnick et al. | 370/337 |
| 2008/0198815 A1* | 8/2008 | Liu | 370/336 |
| 2008/0198865 A1 | 8/2008 | Rudnick et al. | 370/406 |
| 2010/0260131 A1* | 10/2010 | Ghanadan et al. | 370/329 |
| 2011/0255445 A1* | 10/2011 | Johnson et al. | 370/255 |
| 2012/0182867 A1* | 7/2012 | Farrag et al. | 370/230 |
| 2013/0017796 A1* | 1/2013 | Milner et al. | 455/67.13 |

* cited by examiner ns due to satellite delay. An approach to improving ETEL in TDMA based MANETs is disclosed in U.S. Pat. No. 7,894,416 to Rudnick et al., assigned to the present application's assignee, the contents of which are incorporated by reference in their entirety. In this MANET, the transmission ETEL may be reduced by scheduling time slot allocations in the epoch based upon the link placement in the path.

MOBILE AD HOC NETWORK WITH DYNAMIC TDMA SLOT ASSIGNMENTS AND RELATED METHODS

FIELD OF THE INVENTION

The present invention relates to the field of wireless communications, and, more particularly, to mobile ad hoc wireless networks and related methods.

BACKGROUND OF THE INVENTION

Wireless networks have experienced increased development in the past decade. One of the most rapidly developing areas is mobile ad hoc networks (MANETs). Physically, a MANET includes a number of potentially geographically distributed, potentially mobile nodes sharing one or more common radio channels. Compared with other types of networks, such as, cellular networks or satellite networks, MANETs have two distinctive features. First, MANETs lack any fixed infrastructure. Second, each node can act as a router to forward an upstream node's traffic to an ultimate destination, potentially many hops distant. The network is formed of mobile (and potentially stationary) nodes, and is created on the fly as the nodes communicate with each other. The network does not depend on any particular node and dynamically adjusts as some nodes join or others leave the network.

MANETs typically use dynamic routing capabilities. A routing algorithm ensures that data takes an appropriate, and hopefully the fastest, route to a destination node. Some MANETs could include multiple fixed base stations with "cut through" high bandwidth terrestrial links operating as gateways to fixed base stations or other services, including the Internet. It is possible to extend the mesh network with only a minimal base station infrastructure. There are also many different types of routing protocols that can be used in a mesh network, for example, an Ad hoc On-Demand Distance Vector (AODV), Dynamic Source Routing (DSR), Optimized Link State Routing protocol (OLSR) and Temporally-Ordered Routing Algorithm (TORA).

One approach to communication in a MANET may comprise using a Time Division Multiple Access (TDMA) protocol. Depending on the configuration of a TDMA MANET, end-to-end latency (ETEL) can be problematically large. ETEL is the time it takes to deliver a piece of data, typically a data packet, from a source node to a destination node. Thus, ETEL can be referred to as the time duration from when the packet is presented to the data communications layer of the stack at the source node to when the packet is passed up from the data communications layer of the stack at the destination node. MANETs transmit a packet among different intermediate nodes using multiple hops as it traverses the network from a source node to a destination node. In a TDMA network, the channel time slot can be allocated before the node data is transmitted. The channel transmit time is typically allocated in a recurring slot. The channel time typically is segmented into blocks as an epoch and blocks may be divided into slots used by nodes to transmit data.

Depending on the application, a reduced ETEL value may be helpful in achieving good Quality of Service (QoS). For example, interactive two-way speech has demanding ETEL requirements, i.e. this application requires low latency because humans are extremely sensitive to transmission delays. Typical latency needs to less than 150 ms to minimize human-perceptible objections and problems, for example, talking "over" each other in long-distance satellite conversations due to satellite delay. An approach to improving ETEL

SUMMARY OF THE INVENTION

In view of the foregoing background, it is therefore an object of the present invention to provide a MANET that has improved QoS and efficient organization.

This and other objects, features, and advantages in accordance with the present invention are provided by a MANET comprising a plurality of mobile nodes, each including a wireless transceiver and a controller cooperating therewith. The wireless transceiver and a controller are configured to operate in a geographic area using a TDMA protocol and based upon a TDMA epoch including TDMA time slots. The transceiver and controller are further configured to dynamically divide into a plurality of first type mobile nodes and a plurality of second type mobile nodes based upon a current topologic density in the topologic area relative to a topological density threshold, so that each first type mobile node has one or more periodic TDMA time slots allocated in the TDMA epoch and so that each second type mobile node contends for contention interval TDMA time slots in the TDMA epoch. Advantageously, the MANET maintains a proper population of first type and second type nodes for efficient TDMA time slot allocation.

In particular, the plurality of mobile nodes may be configured to dynamically divide so that each second type mobile node has at least one first type mobile node within one hop. The plurality of mobile nodes may be configured to dynamically divide based upon at least one traffic characteristic. Additionally, the plurality of mobile nodes may be configured to dynamically divide based upon a minimum first type mobile node coverage threshold, or to reserve at least one spare TDMA time slot in the TDMA epoch. More specifically, the plurality of second type mobile nodes may be configured to communicate based upon at least one shared TDMA time slot in the TDMA epoch.

In some embodiments, the plurality of second type mobile nodes may be configured to communicate in the at least one shared TDMA time slot by periodically detecting use of the at least one shared TDMA time slot, and communicating when the at least one shared TDMA time slot is available. Also, the plurality of second type mobile nodes may be configured to selectively change a rate of periodically detecting based upon a number of adjacent second type mobile nodes. In addition, the plurality of first type mobile nodes may be configured to exchange isochronous communication.

Another aspect is directed to a method of communicating in a MANET having a plurality of mobile nodes and being in a geographic area. The MANET uses a TDMA protocol based upon a TDMA epoch including TDMA time slots. The method includes dynamically dividing into a plurality of first type mobile nodes and a plurality of second type mobile nodes based upon a current topologic density in the topologic area relative to a topological density threshold so that each first type mobile node has a periodic TDMA time slot allocated in the TDMA epoch and so that each second type mobile node contends for contention interval TDMA time slots in the TDMA epoch.

DETAILED DESCRIPTION OF THE PREFERRED EMBODIMENTS

Figure 1:
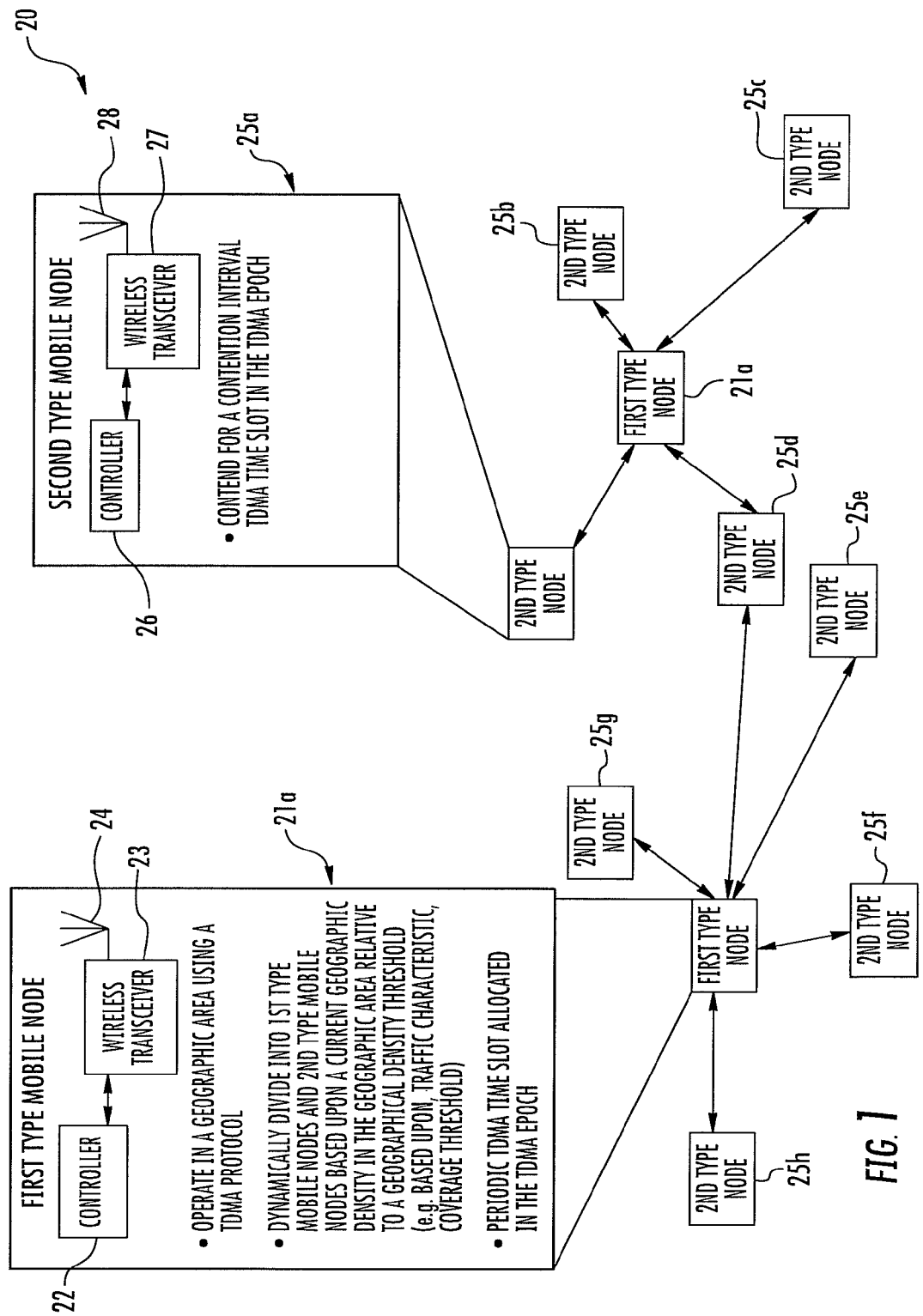
FIG. 1 is a schematic diagram of a MANET according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

For the sake of readability, various acronyms and terms used throughout are defined below.

- Admission Control: a QoS technique designed to maintain a network's ability to continue providing QoS by refusing to admit additional QoS traffic once the network has reached its maximum capacity.
- ANW2: Adaptive Networking Wideband Waveform. A MANET waveform used in the Falcon-3 product family, as available from the Harris Corporation of Melbourne, Fla., the assignee of the present application.
- CDS: Connected Dominating Set.
- Channel Utilization: How much of the potential IM channel bandwidth actually gets used.
- CI: Contention Interval. A part of the epoch set aside for use by T2 nodes using an IEEE 802.11 style of channel access.
- Collision Saturation: An IM net formation condition where node density in the locale is so high that every NbIA net-formation beacon transmission collides with another, with the net result that none is received.
- Contention Interval: An interval in the IM epoch used by tier-two nodes to contend for channel time to transmit data.
- CSMA/CA: Carrier Sense Multiple Access with Collision Avoidance. The core IEEE 802.11 channel access mechanism used in DCF (distributed control function) operation.
- CTS: Clear To Send. Used as part of the RTS-CTS CSMA/CA protocol channel-time reservation mechanism.
- Deferred T1 Migration Set: A set of T1 nodes not participating in demotion when the desired T1 occupancy window is exceeded—typically, T1 nodes actively transmitting high levels of traffic.
- Desired T1 Occupancy Window: The desired number of T1 nodes in a locale.
- Diameter of a MANET: The diameter of a MANET is the highest number of hops across the MANET between any two nodes on the edge of the MANET, when following the shortest path between those two nodes.
- DSA: Dynamic Spectrum Allocation
- DSRA: Distributed Stochastic Realtime Algorithm.
- DTMA: Dynamic Tier Membership Algorithm. Both a core IM mechanism and a DSRA. Arbitrates Tier-one membership.
- DTMA Reaction Speed: How fast DTMA can change T1 membership when requested. A DTMA figure of merit.
- DV: Digital Voice, the ANW2 and IM combat-networked voice solution.
- Epoch: ANW2's or IM's repeating TDMA superframe.
- ETE Latency: End-to-end latency.
- OFar Ranging: A link-state change is far ranging when it will result in changes to the routing tables of distant nodes once they are informed of the change.
- Fisheye Conjecture: The fisheye conjecture states that the more distant the final destination, the less up-to-date and accurate need be the knowledge of the MANET topology near that distant destination to successfully route to it.
- Hidden Node Problem: Consider nodes A, B, and C in the same 2-hop locale as shown. Nodes A and C can hear B, and B can hear them, but B and C can't hear each other. When A and C simultaneously sense the channel, they find it unused. However, when they both then transmit to B, a collision occurs at node B.
- IM: Infinite MANET™.
- Interval: An architectural segment, or part, of an epoch. For example, the IM epoch includes a Beacon Interval, a Contention Interval, a Digital-Voice Interval, and a Data Interval.
- IS: Information Services.
- Initial Net-Formation-Beaconing Probability: The probability with which a node, when beginning net-formation beacon transmissions, will actually transmit.
- Isochronous Data Stream: A continuing stream of latency- and jitter-sensitive data for a source to a destination.
- JTRS: Joint Tactical Radio System.
- Locale: The immediate topological region surrounding a node. The topological diameter of the region is defined by a number of hops. Therefore, a 1-hop locale consists of a node and its immediate neighbors. A 2-hop locale is a node, its immediate neighbors, and their immediate neighbors. And so on. Unless otherwise noted, we will use the term locale to mean a 2-hop locale.
- LPD: Limited Probability of Detect.
- LPI: Limited Probability of Intercept.
- MANET: Mobile Ad-hoc Network.
- NbIA: Neighbor Indirect Acknowledgement. The net-formation, late-node entry (LNE), net maintenance, and net merge algorithm used in the Harris ANW2 MANET waveform.
- Node Demotion: A T1 node becomes a T2 node.
- Node Promotion: A T2 node becomes a T1 node.
- OLSR: Optimized Link-State Routing, AKA RFC-3626
- PLI: Position-Location Information.
- Preferred T1 Migration Set: The set of T1 nodes actively participating in demotion when the desired T1 occupancy window is exceeded. Typically, T1 node transmitting light traffic loads.
- QME: QoS Management Entity.
- QoS: Quality of Service.
- QoS Management Entity: An architectural entity that manages a node's QoS endeavors.
- RFC-3626: Optimized Link-State Routing (OLSR) protocol.

RTS: Request To Send. Used as part of the RTS-CTS CSMA/CA protocol channel-time reservation mechanism.

SA: Situational Awareness.

SI: Supplemental Interval of the epoch. In IM, each tier-one node is allocated at least one beacon slot paired with a corresponding SI data slot block. This corresponds, in ANW2, to a beacon slot, in the beacon interval, paired with a corresponding data slot, in the data interval, of each epoch.

SRW: Soldier Radio Waveform.

T1: Tier one.

T1-Slot-Allocation Locale: The neighborhood across which unique T1 slot allocation is enforced.

T2: Tier two.

TBD: To Be Determined.

TDMA: Time Division Multiple Access.

Tier One Node: High-capacity backbone node. T1 nodes are allocated a TDMA slot each epoch, or more precisely, a TDMA beacon slot in the beacon interval paired with a TDMA data frame in the data interval. Collectively T1 nodes form a virtual backbone overlay network that can provide high-capacity high-QoS data services, including relay of data sourced by other nodes, and MANET control services.

Tier Two Node: Low-capacity non-backbone node. T2 nodes contend for channel access using an IEEE 802.11-style CSMA/CA channel access mechanism.

TLV: Type Length Value. An encoding allowing multiple types and sizes of disparate data to be combined into a single packet transmission payload.

Topology Connector: A backbone node connecting two or more parts of the MANET, that otherwise (ie, if that backbone node were a T2 node instead of a T1 node) would be more distant as reckoned by backbone routing distance.

TTL: Time To Live.

UCS: Use Case Scenario.

Virtual Hot Spot: When fat traffic flows cross, a virtual hot spot can be created while the flows overlap at the cross point.

VoIP: Voice over IP.

WAG: Wild Ass Guess.

WID: Waveform ID. An ANW2 TX-RX encoding, including both the data rate and throughput capacity, used for a particular transmission.

Referring initially to FIG. 1, a MANET 20 according to the present invention is now described. The MANET 20 illustratively includes a plurality of mobile nodes 21a-21b, 25a-25h. The mobile nodes 21a-21b, 25a-25h are divided into a plurality of first type (tier-one) mobile nodes 21a-21b and a plurality of second type (tier-two) mobile nodes 25a-25h, i.e. there are two tiers of mobile node membership. Each first type mobile node 21a-21b illustratively includes a wireless transceiver 23, a controller 22 cooperating therewith, and one or more antenna 24 coupled to the wireless transceiver for communications. Similarly, each second type mobile node 25a-25h illustratively includes a wireless transceiver 27, a controller 26 cooperating therewith, and one or more antenna 28 coupled to the wireless transceiver for communications.

For ease of illustration, only one first type mobile node 21a and one second type mobile node 25a are shown in detail. Nonetheless, as will be readily appreciated by the skilled person in the art, the other first type and second type mobile nodes are similar. For example, each mobile node 21a-21b, 25a-25h may be built upon an advanced networking wideband waveform (ANW2) MANET ManPack, modified by the disclosure herein. The MANET ManPack is available from the Harris Corporation of Melbourne, Fla., the assignee of the present application.

Figure 4:
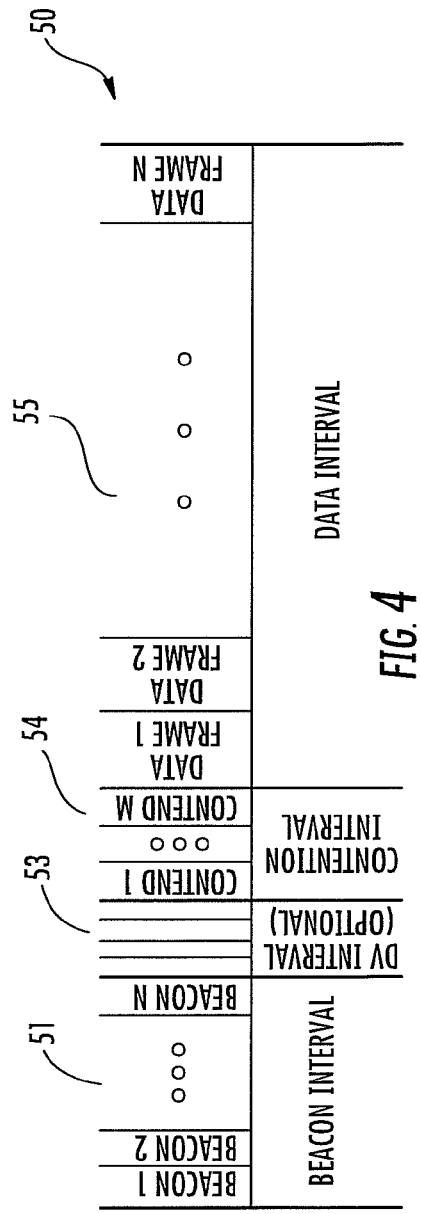
FIG. 4 is a schematic diagram of the epoch in the MANET of FIG. 1.

Referring additionally to FIG. 4, the wireless transceivers 23, 27 and controllers 22, 26 are configured to operate in a geographic area using a TDMA protocol and based upon a TDMA epoch 50 including TDMA time slots. The TDMA epoch 50 illustratively includes a beacon interval 51, an optional digital voice interval 53, a contention interval 54, and a data interval 55. As will be appreciated by those skilled in the art, each TDMA time slot can include a beacon allocation (Beacons 1-n) from the beacon interval 51 and an associated data frame allocation (Data Frame 1-n) from the data interval 55.

The wireless transceivers 23, 27 and controllers 22, 26 are configured to dynamically divide all of the mobile nodes into the first type mobile nodes 21a-21b and the second type mobile nodes 25a-25h based upon a current topologic node density in the topologic area (locale) relative to a topological density threshold. The dividing is performed so that each first type mobile node 21a-21b has a periodic TDMA time slot allocated in the TDMA epoch 50. In other words, the first type mobile nodes 21a-21b each has a guaranteed TDMA time slot allocation in each TDMA epoch 50. The MANET 20 is configured to control the population of first type mobile nodes 21a-21b in the topologic locale and parts thereof so that the first type mobile nodes in each locale do not overwhelm the limited available TDMA time slot resources, i.e. the MANET may reduce the number of first type mobile nodes if the local first type mobile node topologic density value exceeds the topological density threshold.

The dividing is also performed so that each second type mobile node 25a-25h may communicate based upon a shared TDMA e interval, i.e. the contention interval 54, in the TDMA epoch 50. In particular, the second type mobile nodes 25a-25h use the contention interval 54 to communicate with adjacent first type mobile nodes or adjacent second type mobile nodes. As will be appreciated by those skilled in the art the second type mobile nodes 25a-25h may operate based upon a Carrier sense multiple access with collision avoidance (CSMA/CA) protocol.

More specifically, the second type mobile nodes 25a-25h may be configured to communicate in the contention interval 54 by periodically detecting use of the contention interval 54, and communicating when the contention interval 54 is available. Also, the second type mobile nodes 25a-25h may be configured to selectively change a rate of periodically detecting based upon a number of adjacent second type mobile nodes. In other words, as the second type mobile node population density in a locale increases, the competition for use of the contention interval 54 increases. To prevent this from rendering the contention interval 54 useable, the MANET 20 scales down the rate of periodic checks from the second type mobile nodes 25a-25h.

The mobile nodes are configured to dynamically divide so that each second type mobile node has at least one first type mobile node within one hop. Advantageously, the classification of the mobile nodes 21a-21b, 25a-25h as first type or second type is organic and can change in real time depending on current dynamics and topology in the MANET 20.

For example, the mobile nodes 21a-21b, 25a-25h may be configured to dynamically divide based upon at least one traffic characteristic. In particular, if a second type mobile node 25a-25h experiences an increase in traffic, that second type mobile node may be promoted to a first type mobile node. Conversely, if a first type mobile node 21a-21b experiences less traffic over time, or if the first type mobile node becomes duplicative, the first type mobile node may be demoted to a second type mobile node.

Additionally, the mobile nodes 21a-21b, 25a-25h may be configured to dynamically divide based upon a minimum first type mobile node coverage threshold, or to reserve at least one spare TDMA time slot in the TDMA epoch. The first type mobile nodes 21a-21b provide the MANET 20 an infrastructure "backbone," i.e. all communication in the MANET will be routed through the first type mobile nodes. Because of this, the MANET 20 will control the population of first type mobile nodes 21a-21b to provide for adequate coverage throughout the geographic area. Moreover, since second type mobile nodes 25a-25h may need to be quickly be promoted, the MANET 20 culls the population of first type mobile nodes 21a-21b to keep a minimum number of TDMA time slots available.

Additionally, the mobile nodes 21a-21b, 25a-25h may be configured to dynamically divide based upon device performance capability. If a device has plentiful resources (e.g. bandwidth, low queue latency, processing resources, power resources, etc.), the MANET 20 may designate the device as a first type mobile node 21a-21b rather than a second type mobile node 25a-25h. For example, the first type mobile nodes 21a-21b may be configured to exchange isochronous communication. The converse also holds, i.e. if the device has limited resources, the MANET 20 may designate the device as a second type mobile node 25a-25h.

Referring now additionally to FIGS. 2-13, as will be appreciated by those skilled in the art, an exemplary implementation of the MANET 20 is now described.

Section 1: ANW2 and NbIA MANET Waveforms

Adaptive Networking Wideband Waveform (ANW2) is a MANET waveform, as available from the Harris Corporation of Melbourne, Fla., the assignee of the present application. It uses a repeating TDMA epoch, i.e. typically seven epochs per second. Each epoch includes a collection of segments know as intervals, including a beacon interval, a digital voice (DV) interval, and a data interval. Each node is assigned a (beacon, data) slot pair, hereafter referred to simply as a slot (TDMA time slot).

ANW2 supports 1-10, 20, or 30 nodes by configuring 1-10 beacons in the beacon interval, each with a paired data slot in the data interval 33. ANW2 supports 20 or 30 nodes by interleaving their TDMA slots (beacon and data slot pairs) every two or three epochs. ANW2 also supports multi-hop distributed-MIMO-based DV relay. The routing uses an OLSR with some limited link-quality QoS-cognizant-routing modifications. When developing a MANET, it may be easy to become bogged down in a complex technological morass. ANW2 provides an approach to this problem by mostly using established, proven technology, for example, ANW2 uses OLSR as its primary routing algorithm.

NbIA: Neighbor Indirect Acknowledgement

The Neighbor Indirect Acknowledgement (NbIA) algorithm is disclosed in U.S. Pat. No. 7,768,992 to Pun, assigned to the assignee of the present application, the contents of which are incorporated by reference in their entirety. It may be faster, more robust, and simpler in performing alternative net formation, maintenance, bifurcation, and merge mechanisms as compared to typical approaches. Because NbIA is a distributed stochastic real-time algorithm (DSRA), it turns the challenge of distributed operation in the face of high levels of randomness to advantage. NbIA is a contributor to ANW2's success.

The NbIA net-formation procedure can be thought of as a two-phase algorithm. The first phase accomplishes the following.

Locally unique TDMA slot allocation to each node
Global GSN (Group Server Node) election
Global time synchronization using GSN as time reference
In the second phase, each node establishes a globally unique slot via GSN negotiation.

There are three parts to NbIA MANET maintenance—late node entry (LNE), net bifurcation, and net merge. LNE is achieved by having the latecomer synchronize to the local MANET neighborhood, receive a locally unique slot, and then finally receive a globally unique slot via GSN negotiation. Along the way, all nodes in the MANET learn of the joiner. Except for omitting GSN election, this is just regular NbIA net formation applied to a single LNE node.

When the MANET bifurcates, there are no immediate requirements. Eventually the bifurcation is recognized via GSN timeout in the GSN-less MANET segment. When this occurs, a GSN re-election is performed to reestablish GSN functionality within the MANET segment. The MANET segment containing the GSN need do nothing.

When disjoint MANET segments merge, each has its own GSN. One GSN "wins" and the other "loses." Each node belonging to the losing GSN's MANET segment joins the winning GSN's segment using the LNE mechanism.

Experience with NbIA shows that ANW2-based MANET may form and become operational in seconds rather than minutes, as in typical approaches. Moreover, important functions, like networked multi-hop voice operation, can begin as soon as NbIA stage-one completes.

Section 2: Introduction and Motivation: Infinite MANET

As disclosed herein, the Infinite MANET (IM) is now described. IM is intended to scale up MANET size, the number of nodes in a single MANET, by multiple orders of magnitude.

The IM core builds upon the successes of ANW2 and includes of several modifications and extensions to ANW2. A first is moving to a two-tier MANET architecture with dynamic tier membership. A second is adapting ANW2's core NbIA algorithm to the two-tier IM architecture. These two modifications are intended to work together synergistically to give IM many attractive characteristics, including the following.

Arbitrary number of nodes in a single MANET
High levels of robust geographic channel-time reuse
Rapid adaptation to IM topology change
Rapid adaptation to local changes in node density
The core IM implementation is intended to provide a sound foundation to build upon, thereby providing crucial support for additional MANET improvements, including each of the following.

Rapid and robust dynamic channel-time allocation
Explicit support for isochronous data streams
Robust QoS, including QoS-cognizant routing and Express QoS (as disclosed in U.S. Pat. No. 7,773,575 to Rudnick, the contents of which are incorporated by reference in their entirety)
Pinch point and congestion load balancing, both physical and virtual Taken together, these improvements will constitute a major step towards delivering a simple, flexible, resilient, and robust MANET.

Workability: NbIA, DTMA and DSRA

At its core, IM is the marriage of a simplified NbIA netformation algorithm with a dynamic two-tier MANET architecture incorporating a dynamic tier-membership algorithm (DTMA). The combination may be both synergistic and powerful. NbIA is a MANET net formation and maintenance algorithm. NbIA is a good match for the distributed-computation dynamic-topology MANET environment because it's a DSRA. The same may be true for DTMA.

DSRA are Distributed

NbIA is a single algorithm running simultaneously, in a distributed fashion, across a geographically disperse set of MANET nodes. The algorithm's execution is distributed, and just as important, algorithmic state is distributed across the MANET. Conceptually, the algorithm lives and operates across an ensemble of nodes—it's an ensemble algorithm. This matters because a MANET is, intrinsically and algorithmically, a parallel processing machine—making DSRA ensemble algorithms and MANET a perfect match. Taken together, this constitutes the "distributed" part of NbIA being a DSRA.

DSRA Are Stochastic

NbIA operation is stochastic—it uses and harnesses randomness. Each node independently starts its local timer. This results in an initial random timer/time-base phasing across the ensemble of MANET nodes and in every locale. The RF channel is fundamentally stochastic in nature—some packets get through unharmed, others don't. Node movement and changing topology contribute additional randomness. Each node sources and sinks specific traffic. As a result, each node's position and role in the MANET topology contributes more functional randomness. NbIA typically functions well in the presence of all these layers of randomness—the "stochastic" part of NbIA being a DSRA.

DSRA Real-Time and the DSRA Challenge

Finally, NbIA is an algorithm that operates in real time—the "real-time algorithm" part of NbIA being a DSRA.

NbIA derives much of its robustness, performance, and resilience by virtue of being a DSRA. Important NbIA behaviors are emergent, cooperative, and self-organizing. NbIA exhibits the robust performance, graceful degradation, and rapid convergence frequently found in other DSRA, for example, many artificial neural networks.

The Dynamic Tier-Management Algorithm (DTMA) is also a DSRA. DTMA harnesses both endogenous and exogenous randomness to function well in the presence of exogenous randomness and noise. DTMA is intended to work synergistically and cooperatively with NbIA. Conceptually, IM can be thought of as extending/adapting ANW2 NbIA to IM's two-tier architecture.

Section 3: NbIA, Time Synchronization and Local Slot Allocation

Because IM is, in part, a modification and extension of NbIA, to understand IM, NbIA must be first understood. NbIA is a big part of what makes ANW2 stand out from other MANET approaches.

NbIA performs net formation in two phases. The first phase elects a GSN, achieves global time synchronization, and establishes locally unique TDMA slot allocations. The second phase assigns each node a globally unique slot. As seen in a later section, IM uses only NbIA's first phase, so that will be our focus in this section.

In this section, some of the core net-formation mechanisms used by NbIA are described as a prelude to addressing how NbIA is changed for IM. LNE and net merge are relatively simple variations of NbIA net formation, accordingly, their description in detail is omitted and unnecessary for those skilled in the art.

NbIA Phase One

When a node powers up, the first thing it does is randomly select an epoch start time and then listen for a fraction of a second. If it hears an already formed MANET that it can join, it joins. If it hears a MANET engaged in net formation and it could join that MANET once it becomes operational, the node joins the net-formation effort. If the node hears neither of these, the node eventually begins its own net formation process by randomly selecting a TDMA slot using its current time base and transmitting a net-formation beacon each epoch thereafter.

If the node fails to receive any acknowledgement of its net-formation beacon transmissions over an extended period, it will randomly select another slot in the epoch for its use. This is the NbIA void of ACK collision-detection mechanism. This can happen repeatedly, especially if the node is the only node in its locale. If, after a fixed period, the node has received no response to its net formation beacon transmissions, and still has not heard an operational beacon from a MANET it can join, the node becomes the GSN of its own MANET—in effect, creating its own MANET that includes only one node, itself. Then, after another fixed period as GSN, the node will transition from net-formation mode to normal-operation mode, and advertise that fact in its beacons, so that any other nodes in its GSN domain (described below) can join using the LNE mechanism.

As a practical matter, most of the time the first node to power up will win the race to start a MANET by virtue of coming up first and, after a fixed period, creating a one-node MANET. Later, when other nodes power up, they hear this node and simply join its already-formed MANET. Alternatively, they hear some other node that has already formed its own MANET and join it. Later, when enough nodes have powered up or moved so that the two previously disjoint MANET segments come into contact, the NbIA net merge process is invoked and the "losing" segment joins the "winning" MANET on an individual node basis using NbIA's LNE process. The winner is the GSN with the lowest Media Access Control address (MAC address). Alternatively, some other deterministic selection criteria can be used to determine the winner.

The startup processes just described are simple examples of the ANW2 net formation process. A more interesting example occurs when multiple nodes power up more or less simultaneously in the same locale, so that mutual self-synchronization and beacon transmission collision resolution are required. That process is now described.

Figure 2:
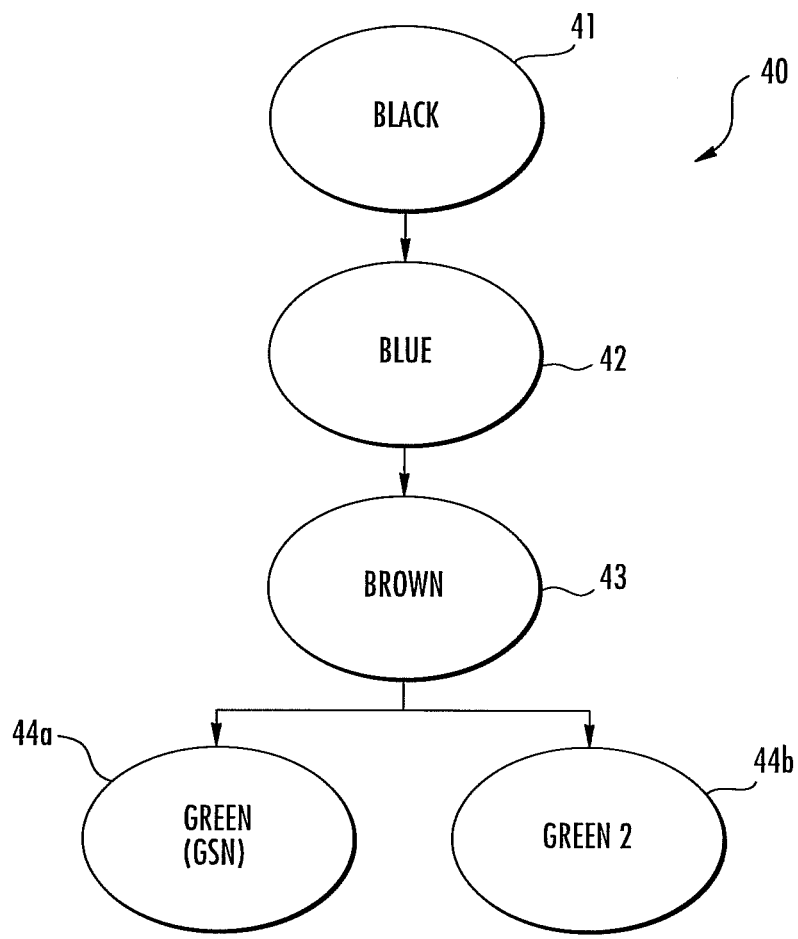
FIG. 2 is a diagram illustrating NbIA state changes for nodes in the MANET of FIG. 1.

Referring additionally to FIG. 2, a NbIA net-formation node state diagram 40 is shown. All nodes engage in a race to be "elected" GSN. All nodes power up in the black state 41. As shown in FIG. 2, a node is elected GSN by advancing through a series of "election" states. Each node begins in the black election state, advances through the blue and brown election states 42-43, and finally becomes GSN when it reaches the green election state 44a.

Being elected GSN is a mutual bootstrap process. A node may advance no faster than one election state per TDMA epoch. A node advances when a 1-hop neighbor acknowledges having heard its prior beacon transmission, but only when that neighbor is at an equal or higher election state. Finally, nodes move to the green2 election state 44b when they detect a 1-hop neighbor is a GSN or has adopted the time base of a GSN, i.e., is in election state green2.

GSN Domain and GSN Domain Capture

Whenever a node actively participating in a local NbIA GSN election detects a 1-hop neighbor is in election state green or green2 44a-44b, that node takes the following actions.

Immediately advances to election state green2 44b

Transitions to its green/green2 neighbor's time base following its next beacon transmission Advertises, in its next and succeeding beacons, that it has adopted that neighbor's GSN as its time reference What all this means, as a practical matter, is that as soon as any node wins its local GSN election, anywhere in the MANET, it rapidly gathers the rest of the nodes in the MANET into its GSN domain, the set of green/green2 nodes who have adopted it as their time reference. This capture process can be visualized as a rapidly expanding wave front, centered on the GSN, traversing the MANET. It takes, minimally, several epochs for a GSN to be elected, but once elected, a GSN's domain can potentially advance multiple hops each epoch as the GSN captures the MANET.

GSN Runoff Election: Domain Collision and Collision Resolution

Two cases can occur during a GSN domain capture process. The first occurs when a new GSN's domain advances uncontested across the MANET, as described in the prior subsection. In this case, the GSN's election is uncontested and it rapidly becomes the GSN time reference for the entire MANET. The second case occurs when more than one GSN are more or less simultaneously elected in different locales (or even within the same locale). In this case, a GSN runoff election occurs. The arbitration occurs when a node already in a GSN domain, or about to join a GSN domain, detects that a 1-hop neighbor has just joined a different GSN domain. When this happens, the GSN having the lowest MAC address wins the implicit GSN runoff election. This works because MAC ID's are unique, so ties are not possible.

What this means, in practice, is that when multiple GSN are more or less simultaneously elected in multiple, potentially disjoint, locales across the MANET, the GSN domain of the GSN having the smallest MAC address propagates across the MANET completely unimpeded by any other GSN domains it may happen to encounter—exactly as though no other GSN existed. This is the essence of the GSN runoff election.

Slot Allocation Collision: Detection and Resolution

In addition to GSN election and global time synchronization, another important aspect of NbIA stage one is local slot-allocation collision detection and resolution. In a variety of ways, at any time, two or more T1 nodes in a locale may simultaneously occupy a single TDMA slot. This is termed a slot allocation collision. When this occurs, the colliding nodes will simultaneously transmit, with the result that some or all of their 1-hop neighbors will fail to receive those transmissions—ongoing/repeating collisions can occur.

NbIA includes multiple mechanisms to locally detect and resolve slot-allocation collisions.

Void of ACK
Asymmetric link detection
Shifted look through
Some additional slot-collision detection and resolution mechanisms that may not currently be included in ANW2

Local collision detection and resolution is a capability that makes NbIA work.

Section 4: Core Infinite MANET (IM): Two Tiers and DTMA

In this section, some elements of IM are introduced. First, IM's two-tier architecture is introduced. The disclosure also addresses how the dynamic tier-membership algorithm may work synergistically with the IM-modified NbIA algorithm to give IM superior performance characteristics.

IM Two-Tier Architecture

Figure 3:
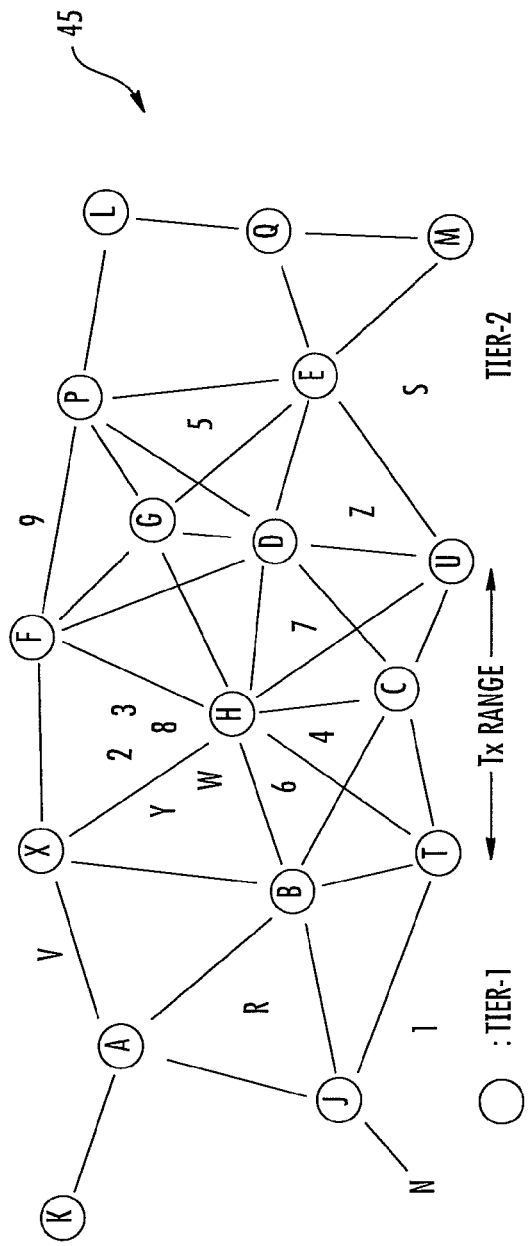
FIG. 3 is a topology diagram of a part of the MANET of FIG. 1.

IM includes of two core modifications, among others, to ANW2. First, and most important, IM morphs ANW2's flat MANET architecture into a two-tier architecture. FIG. 3 shows a possible "slice" of an IM, the tier-one backbone being shown with circles around the nodes and tier-two nodes are shown without the circles. This should be thought of as a rectangular part of a potentially much larger MANET. Tier-one nodes are "have" nodes (First type mobile nodes). Each is allocated a regularly recurring TDMA slot.

Referring additionally to FIG. 3, a slice topology diagram 45 a two-tier IM slice where T1 backbone nodes are circled. In contrast, tier-two nodes are "have not" nodes (Second type mobile nodes). They have no TDMA slot allocations. Instead, they use an 802.11-style CSMA/CA (carrier sense, multiple access, collision avoidance) channel-access contention mechanism. Referring again to FIG. 4, the epoch 50 is modified for IM by adding the contention interval 54.

Tier One

Conceptually, tier-one nodes (T1 nodes) form a high-capacity virtual backbone overlay network that may be suitable for data-transmission and relay of both user data packets and MANET control packets. Because each T1 node has a regularly recurring TDMA slot allocated for its use in each epoch, it can typically both transmit data it originates and relay data sourced by other nodes, each potentially with low latency.

Thus, T1 nodes may be ideal for sourcing high-volume high-QoS data, such as video streams, and high-volume low-QoS data (e.g., bulk file transfers). Note that a T2 node initiating a high-volume isochronous data stream can easily be promoted to T1 status and thus acquire a recurring TDMA slot—a strength of IM. Of course, T1 nodes can also source/relay low-volume data like position-location information (PLI), application heartbeats, and the like. Note also that these large and recurring T1 slot allocations provide a foundation upon which QoS can be built, as described later.

Tier Two

In contrast, tier-two nodes (T2 nodes) contend for channel access using an IEEE-802.11-style CSMA/CA channel access mechanism. A contention interval (CI) in the epoch is created for this purpose. IM is engineered, via IM NbIA and DTMA, to insure every T2 node has one or more T1 nodes as 1-hop neighbors. This means when a T2-sourced data packet is transmitted to a remote destination, the packet can reach a T1 node in its first hop. For the rest of that packet's journey, it flows along the T1 backbone to its destination.

RTS/CTS: Part of Basic T2 Channel Access

When a T2 node transmits a packet, it should probably first engage in a request to send, clear to send (RTS-CTS) protocol exchange. This is intended to (partially, in the case of broadcast traffic) reserve the channel to avoid/minimize hidden node problems. Variations are possible (e.g. requesting more than one CTS via the RTS). Determining what's best in this regard is part of the IM work to be performed.

T2 Node-Density Scaling

IM scales to ever-higher node counts by migrating "excess" nodes in the locale (i.e., more nodes than may fit into the tier-one backbone TDMA epoch slots) into tier two. This means the number of T2 nodes in a locale can grow arbitrarily large. To keep T2 channel access working as the number of T2 nodes in the locale becomes ever larger, the slice of T2 channel access allocated to each T2 node must grow ever smaller. This provides the flexibility to slice the T2 channel-access pie into ever-smaller pieces.

Each T2 node can compete with its T2 neighbors within the locale for use of the limited slice of channel bandwidth contained in the contention interval 54 of the IM epoch 50 using a CSMA/CA channel access mechanism. To make this kind of channel access work as T2 node density varies in the locale, the following adjustment must be made to the CSMA/CA mechanism. As T2 locale node-density increases, the minimum interval between each T2 node's channel access attempts must increase, on average. As a result, maximum T2 transmission bandwidth, per node, on average may decrease. Otherwise, T2 transmission collisions may rise to unacceptable levels.

This dial-down of T2 transmission attempts, as T2-node locale density increases, makes T2 nodes appropriate to source only comparatively low volumes of low-QoS data, such as situational awareness. Of course, if a T2 node suddenly needs to transmit a large volume of data, it can promote itself to T1 status—this flexibility is inherent to IM. In effect, the maximum frequency of a T2 node's transmission attempts is scaled inversely to T2 density in the locale—more T2 nodes means less-frequent transmission attempts. To accomplish this adaptation to T2 node density, each T2 node must possess an estimate of the number of T2 nodes in its locale. This can be accomplished as follows.

First, each T1 node periodically broadcasts its current count of known 1-hop T2 neighbors. This can be sent as a type, length, value format (TLV), potentially piggybacking upon another transmission. Similarly, T2 nodes periodically include a TLV in one of their transmissions containing the T2 node's current count of T1 1-hop neighbors. Based upon receiving these transmissions from 1-hop T1 and T2 neighbors, and applying heuristics, each T1 node can estimate the number of T2 nodes in its locale. T2 nodes can do likewise.

Note that the estimate need not be perfect—there's a tradeoff between the overall accuracy of estimation and minimizing T2 data transmitted in the locale. Better estimation may be best, but close is likely to be adequate. How good an estimate can be achieved, and at what T2 data-transmission efficiency, is part of the work to be done.

Note that standard IEEE 802.11 CSMA/CA backoff and contention-window adaptation mechanisms effectively add an additional layer of T2 node-density scaling atop the T2 node-density estimation mechanism, described above, with respect to scaling T2 channel-access rate. That is exactly their original purpose—dynamically scaling the frequency of channel access attempts based upon overall demand (contention levels). Of course, IEEE 802.11 may be tailored for IEEE 802.11 operation. Over all, this work can be characterized as investigating how standard IEEE 802.11 CSMA/CA mechanisms can be tailored and augmented for IM T2 node-density scaling purposes.

IM DTMA

The fact that tier-membership is dynamic may be a key feature of IM—nodes can move between tiers. DTMA is a core part of how ANW2 NbIA is to be adapted to IM's dynamic two-tier architecture. Thus, DTMA is at the heart of how IM differs from ANW2. Naturally enough, DTMA is a DSRA.

There are two overriding goals of DTMA operation. One is to keep the number of T1 nodes in the locale within the desired T1 occupancy window. The second includes quickly allocating channel time, in the form of T1 slots, to adjust MANET backbone topology to support a variety of desired IM performance features.

Conceptually, nodes are free to move between tiers, but as a practical matter, the tier-membership algorithm must balance the following, sometimes conflicting, goals.

Maintain an adequate T1 node density within each locale
  Use/allocate most T1 channel time, i.e., TDMA slots, within each locale
Maintain backbone integrity: No broken backbones
  Support routeability via the T1 backbone
Insure every T2 node has at least one T1 node as a 1-hop neighbor Every T2 node must have direct access to the backbone
  Maintain backbone as a CDS (connected dominating set): backbone spans MANET
Maintain an adequate level of unallocated T1 slots in every locale
  Supports rapid node tier migration—immediate promotion of T2 nodes
Backbone topology support for routing
  Minimize hops to destinations
  Support routing redundancy
Backbone topology support for congestion (hot spot) remediation
  No hot spots to backup or constrain user traffic
Backbone topology support for QoS
  Enables Express QoS to minimize ETEL
Support-for/integration-with OLSR operation
  Cross-layer coordination and optimization These goals can be conceptually summarized as 1) maintain IM invariants in each locale (first four items), and 2) adjust backbone topology and T1 membership to simultaneously support additional desired IM features and high-performance characteristics (remaining four items).

DTMA Invariants

An invariant is a relationship that is desired to be always true. For DTMA, the following invariants are desired to be satisfied.

Every locale keeps its number of T1 nodes within the desired T1 occupancy window
  Maximize use of channel bandwidth reserved for T1 nodes
  Maximize geographic reuse of channel time
Maintain backbone integrity—no broken backbones
  Supports T1 route-ability
Every T2 node has one or more T1 nodes as 1-hop neighbors
  Backbone spans the MANET
Maintain an adequate level of unallocated T1 slots in every locale
  Maintain T1 "headroom" for rapid promotion of T2 nodes It is desired that these DTMA invariants be always satisfied.

The Locale

Figure 5:
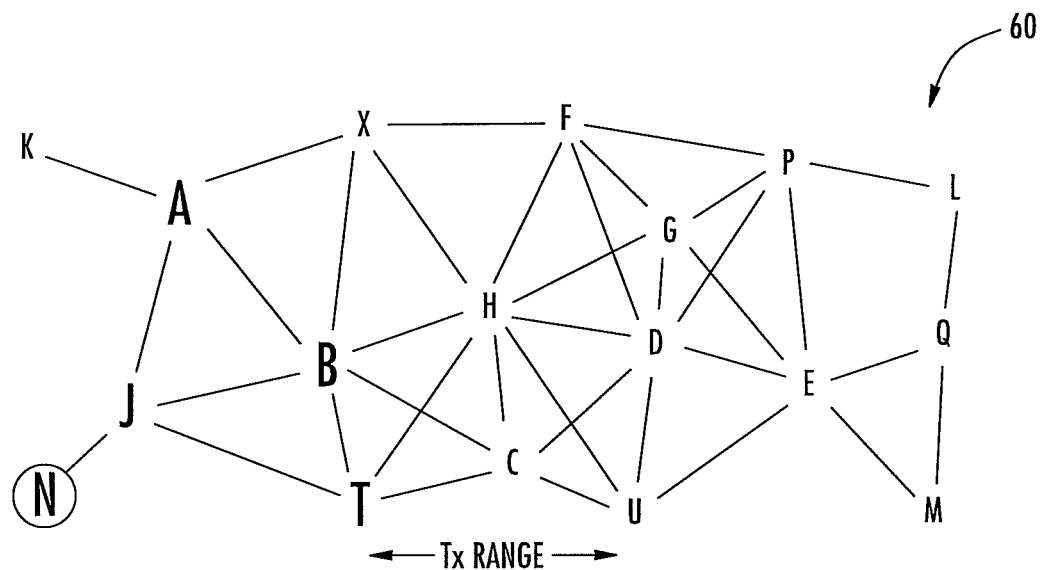
FIGS. 5-11 are topology diagrams of a part of the MANET of FIG. 1.
Figure 6:
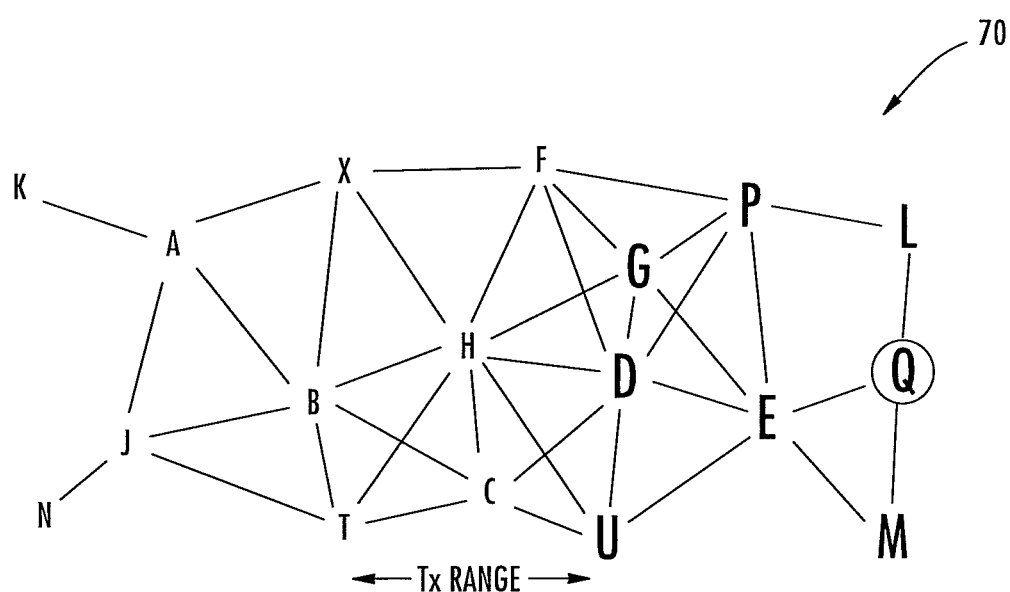
Figure 7:
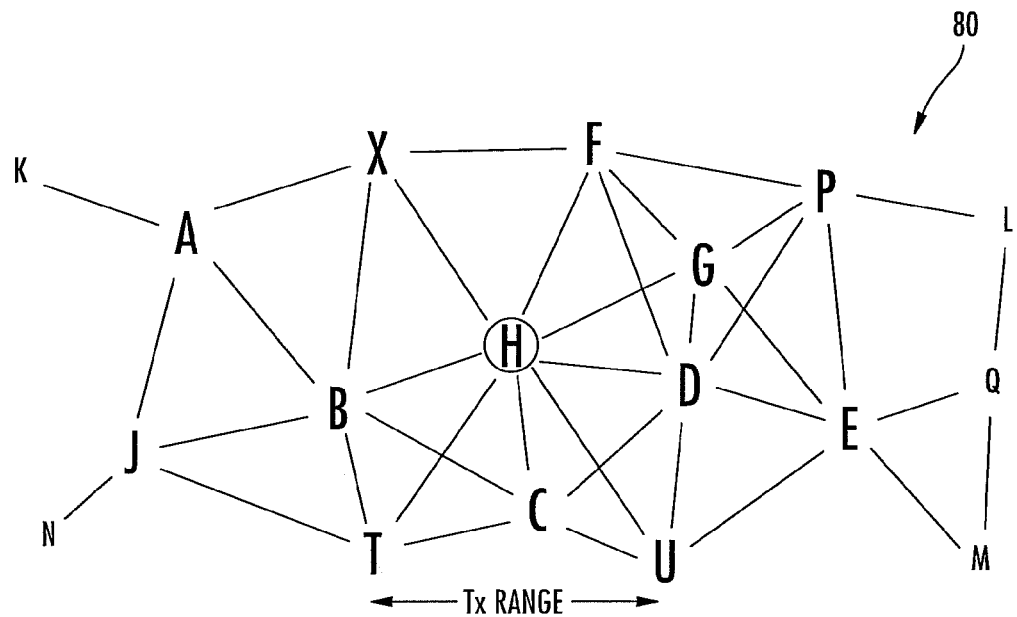

"Locale" is a key IM concept. A locale can be conceptualized as a node's nearby MANET region. More specifically, a locale is defined as the immediate topological region surrounding a node. There are as many locales as there are nodes—every node is the center of its locale. The diameter of the locale is defined in units of hops. A 1-hop locale is a node and its immediate 1-hop neighbors. A 2-hop locale is a node, its immediate 1-hop neighbors, and their immediate 1-hop neighbors, and so on. Unless otherwise noted, the term locale may be taken to mean a 2-hop locale. Returning to the example IM slice topology diagram 45 shown in FIG. 3, and leaving out, i.e., ignoring, T2 nodes, FIG. 5, FIG. 6, and FIG. 7 show the locales 60, 70, 80 of nodes N, Q, and H (each circled in its figure), respectively. In FIG. 5, node N is circled and other members of its locale are shown in bold type. In FIG. 6, node Q is circled and other members of its locale are shown in bold type. In FIG. 7, node H is circled and other members of its locale are shown in bold type.

T1 Slot Allocation is Locale-Based

A primary DTMA goal and invariant is to avoid having any T1 slot be simultaneously used by more than one node within a locale. Maintaining this invariant may avoid various kinds of collisions and hidden-node problems. This may require T1 slot allocations be unique within the locale.

Tier Migration is Locale Based

The locale is the unit of relevance for T1 node density and tier migration. In other words, node migration between tiers is locale based. The number of T1 nodes in the local is a primary driver of inter-tier migration because the number of TDMA slots in the epoch is fixed for any particular IM. When T1 nodes leave a locale, their TDMA slot allocations may be reallocated within the locale to maintain optimal usage of channel time. This can be accomplished by T1 nodes from other locales moving into the neighborhood, by T2 nodes within the locale being promoted to T1 status, or by allocating multiple TDMA slots to some of the T1 nodes remaining in the locale.

Desired T1 Occupancy Window

There's an implicit tension between two competing sets of DTMA goals. On the one hand, the MANET may want to have as many T1 slots allocated and used, in the locale, as possible to maximize T1 throughput, geographic reuse, MANET throughput, and overall channel utilization. On the other hand, the MANET may want to keep some T1 slots in the locale free to maximize IM's ability to rapidly respond to changing demands by quickly promoting T2 nodes to T1 status. The latter can be needed when new streams start up, when topology changes, and when hotspots need to be resolved and loads balanced. These conflicting goals are balanced by use of the desired T1 occupancy window.

Core DTMA

Core default DTMA activity can be succinctly summed up as follows. When the number of T1 nodes in the locale is above the desired T1 occupancy window, each T1 node in the locale probabilistically migrates to T2. When the number of T1 nodes in the locale is below the desired T1 occupancy window, T2 nodes probabilistically migrate to T1. These actions correspond to the two "do something" Core DTMA Migration Actions of Table 1.

TABLE 1

Core DTMA migration actions

| | node is currently T1 | node is currently T2 |
|---|---|---|
| above desired T1 occupancy window | become T2 with probability p1 | do nothing |
| within desired T1 occupancy window | do nothing | do nothing |
| below desired T1 occupancy window | do nothing | become T1 with probability p2 |

This core DTMA DSRA can be biased in various ways and for various purposes, both with respect to default behavior and to explicitly boost various performance measures.

Tier Migration: Sources and Sinks

A useful way of conceptualizing tier migration within a locale is the "sources and sinks" view. T1 sources include the following.

Existing T1 nodes moving into the locale
New nodes joining the MANET
Promotion of T2 nodes to T1 within the locale
  To avoid undershooting the desired T1 occupancy window
  To support desired IM features, functions, and needs, (e.g. related to traffic patterns)

T1 sinks include the following.
Existing T1 nodes moving out of the locale
Existing T1 nodes leaving the MANET
Demotion of T1 nodes to T2 within the locale
  To avoid overshooting desired T1 occupancy window T2 sources include the following.
Existing T2 nodes moving into the locale
New nodes joining the MANET
Demotion of T1 nodes to T2 within the locale
  To avoid overshooting the desired T1 occupancy window T2 sinks include the following.
Existing T2 nodes moving out of the locale
Existing T2 nodes leaving the MANET
Promotion of T2 nodes to T1 within the locale
  To avoid undershooting desired T1 occupancy window
  To support desired IM features, functions, and needs, (e.g. related to traffic patterns)

Sources, Sinks, and Node Promotion

An important distinction between node promotion (T2 nodes migrating to T1) and node demotion (T1 nodes migrating to T2) is the following. Node promotion can be triggered to boost MANET performance, in addition to performing the core DTMA task of raising the number of T1 nodes into the desired T1 occupancy window. In contrast, node demotion is only triggered to bring the number of T1 nodes down into the desired T1 occupancy window when the window has been exceeded in a locale.

Performance-enhancing node-promotion triggers include the following (additional triggers are possible).
Maintain the integrity of the backbone
Guarantee every T2 node has at least one T1 1-hop neighbor
Backbone topology support for routing (including routing redundancy)
Backbone topology support for hot-spot avoidance and resolution
Backbone topology support for QoS (e.g., reliable high-bandwidth links)
Support for and integration with OLSR operation These performance-promotion triggers can pump the number of T1 nodes in a locale above the desired T1 occupancy window.

Node demotion can be viewed, in part, as a passive response to active node promotion undertaken to boost MANET performance. When viewed as sources and sinks, T1-node sources actively pump new T1 nodes into the locale, while excess T1 nodes passively drain out a single node demotion sink.

Node Demotion

For the same extrinsic reasons, the system sometimes "pushes" T2 nodes to become T1, we will sometimes want to defer demotion of selected T1 nodes. In other words, similar to biasing node promotion to boost IM performance, biased migration can also be desirable for node demotion.

For example, a T1 node that is actively using its full T1 allocation(s) should probably defer migrating to T2. Instead, the MANET may prefer to demote "idle" or "lightly loaded" T1 nodes. Similarly, demoting a T2 node's last 1-hop T1 neighbor would violate the IM invariant that all T2 nodes are within 1-hop of the backbone (i.e., a T1 node); demoting that T1 node would necessitate the immediate promotion of a T2 node to maintain the invariant.

Call the "idle" or "lightly loaded" T1 nodes are the preferred T1 migration set. Similarly, call the remaining T1 nodes the deferred T1 migration set. As an overshoot of the desired T1 occupancy window continues in a locale, the p1 probability of migration for the preferred T1 migration set should gradually rise, probably as a logistic function of the duration of the overshoot.

DTMA: Dynamic Channel Time Allocation

Maintaining unallocated T1 slots in the locale allows DTMA to rapidly allocate channel time (among other things). Slot pairs can be allocated to a T2 node to promote it to T1 status, or to an existing T1 node to increase its channel time allocation. Allocations can be extrinsic, i.e., requested by other IM algorithms (e.g., routing, load balancing, etc), or intrinsic, for example, to raise the number of T1 nodes in the locale into the desired T1 occupancy window, or maintain IM invariants. Examples of dynamic channel time allocation include the following. Other examples are possible.

- A T2 node begins sourcing a large volume of data, either bulk data or an isochronous stream (e.g. a video stream)
- To resolve data-forwarding congestion—hot spots
    - When a hot spot already exists or is about to be created
    - Hot spots can be virtual (when traffic streams cross) or topological (a backbone pinch-point)
    - Hot spots can be resolved in two ways
        - Promoting one or more T2 nodes to T1 status and then rerouting some hotspot traffic through the new T1 node
        - Allocating a T1 hot-spot node additional slots
- To aid or improve QoS (more on this in the QoS section below)
    - When starting a new high-QoS isochronous data stream, promote T2 nodes to insure a short contiguous sequence of T1 nodes from source to destination
    - Juggle T1 slot allocations, from source to destination along a route, into slot order within the epoch, to use Express QoS to minimize end-to-end latency Collision Saturation During Net Formation A potential problem can crop up during IM net formation when the locale's node density reaches levels so high that all, or nearly all, net-formation beacon transmissions collide. In this case, no nodes may successfully receive anything and the IM may fail to form. Call this collision saturation.

There are various ways to deal with this, but a particularly simple way is to have most nodes start out as T2 nodes, which don't actively participate in net formation. Over time, they exponentially scale up their probability of switching to tier one and thereby actively participating in net formation. The exponential constant is set based upon the maximum number of nodes the IM is configured for in pre-operational planning. This may allow it to handle the worst case, where all nodes power up in simultaneously in a single locale.

In addition, each T2 node monitors how often T1 net-formation beacon transmissions occur within its locale. When T1 net-formation beacon transmission occurrence reaches a level desirable for net formation to succeed, a T2 node halts the exponential growth in its T2-node-promotion probability to prevent collision saturation. Because the probability of promotion grows exponentially, the MANET quickly reaches T1-membership levels needed for successful net formation.

Section 5: IM Routing

Routing considerations are pervasive in IM and come in many forms.

IM Routing Overview

The MANET may continue to use OLSR for IM as it can be made to scale adequately. The idea is to run a modified version of OLSR among T1 nodes, where every T1 node having 1-hop T2 neighbors generates TC messages and no T2 nodes do. Further, each T2 node is treated logically as an OLSR MPR-spanning-tree leaf selecting a 1-hop T1 neighbor to advertise forwarding to the T2 node.

For OLSR scaling, a primary concern may comprise Topology Control (TC), Host and Network Association (HNA), and HELLO OLSR messaging, multi-point relay (MPR) selection, and the MPR-spanning-tree routing mechanism. There may be three areas of concern.

- Improving OLSR efficiency and scaling as the number of IM nodes grows
- Supporting QoS
- Integrating and/or coordinating OLSR operation, as an extrinsic DTMA driver, with DTMA operation In this section, the focus is on the first of these. QoS routing aspects are handled later in the QoS section. The ability of DTMA to serve extrinsic IM needs was addressed in the DTMA section. The overall approach to scaling OLSR is to adopt a fish-eye philosophy for the distribution of local topology information via TC messaging, combined with occasional distribution of the full IM topology using either a centralized or a distributed approach.

OLSR IM Basics

The starting point is to run the full standard OLSR TC and HELLO messaging, but only on T1 nodes, and modified to provide routing coverage for T2 nodes. T2 nodes may participate in an abbreviated, local, and less-frequent form of announcement messaging scaled to the density of T2 nodes in the locale, but no TC messaging. This makes T2 nodes routable, but never chosen as MPR. All routes, including routes to T2 nodes, flow exclusively through backbone-based MPR spanning trees. The IM invariant, that every T2 node has at least one T1 node as a 1-hop neighbor, guarantees this approach can route traffic to and from T2 nodes.

Based upon simulation studies, it is believed that this simple approach may suffice to scale IM routing up to 50, or so, T1 nodes in the IM, before standard OLSR control traffic may begin to become burdensome. The number of T1 nodes in an IM depends upon both the total number of IM nodes and the current MANET topology—dispersed high-diameter topologies may have more T1 nodes as compared to more-compact lower-diameter topologies. Thus, with sufficiently limited IM diameter, this approach can support an arbitrary number of IM nodes (most of which may be T2 nodes).

To move to more T1 nodes and larger IM diameters, significant additional OLSR scaling efficiencies must be pursued. Otherwise, as the number of IM nodes grows, OLSR traffic may saturate the backbone in higher-diameter topologies.

OLSR Scaling: Efficiency Improvements

There are several aspects to scaling OLSR for IM based upon the various classes of OLSR channel-time uses—HELLO, HNA, and TC messaging. They are discussed in this section. These scaling efforts are in addition to improving OLSR message coding efficiency.

Easy OLSR Scaling: HELLO Messaging

IM OLSR HELLO messaging may scale linearly in the number of T1 nodes for high-diameter topologies (the worst case) in terms of total packets transmitted. This isn't as onerous as it sounds for scaling to large numbers of nodes, because it is expected that the amount of channel time available for use may also scale linearly in the number of T1 nodes due to geographic reuse channel time as the diameter of the IM increases. The amount of TDMA channel time available in each locale is constant and the so is the number of T1 nodes in each locale—enforced by DTMA. Thus, the net effect is that overall T1 HELLO channel time consumption may scale as a constant in the number of T1 nodes.

T2 nodes are required to perform only a small subset of the standard OLSR HELLO functionality, both spatially and temporally. It is desired that each T2 node establish at least a single symmetrical T1 1-hop-neighbor connection.

Recall there is a limited number of CSMA/CA contention slots in the epoch that are shared by all T2 nodes in the locale.

When the number of T2 nodes in a locale becomes large, the frequency of their OLSR HELLO activity must be reduced. Doing this avoids clogging the contention slots and generating high levels of collisions.

Flooded OLSR Messaging: HNA and TC

T1 HELLO messages and T2 announcement messages may not be major concerns with respect to scaling IM to large numbers of nodes because they are not forwarded. However, OLSR TC and HNA messaging are flooded across the MANET and so are of greater concern. When running standard OLSR only on T1 backbone nodes, OLSR's TC and HNA messages are flooded across the backbone using OLSR's MPR-spanning-tree efficient-flooding mechanism. TC and HNA channel-time usage seems likely to be a good match to IM geographic channel-time reuse. Even so, it is believed that OLSR-standard TC and HNA messaging afford significant efficiency-improvement opportunities.

Scaling HNA Messaging

Host and Network Association (HNA) messages are used in OLSR to distribute the network address and mask of each interface of each node in the MANET—current information about every node's network interfaces, including non-OLSR interfaces. TC's include neither network mask nor non-OLSR interfaces; HNA's do.

Typically, the HNA information only changes when a node enters or leaves the MANET, so it seldom changes. There are two easy and attractive approaches to minimizing/eliminating HNA messaging—dialing it down over time and pre-distribution. Because HNA scaling is so easy to achieve, these scaling solutions won't be discussed here further.

Scaling TC Messaging: Hop-Count and Emission Rate

A salient characteristic of OLSR, when used for routing in high-diameter MANET topologies, is that each node's notion of the local topology surrounding distant nodes becomes more out-of-date, on average, the greater the distance (in hops) to each distant node. This is a natural consequence of the fact that it takes time for TC messages (which piggyback on each node's intrinsically generated OLSR message emission packets for efficiency) to move across the MANET—the further the TC message must travel, the longer it takes to do so and the more out-of-date is the information when finally received.

Nevertheless, routing using old topology information for distant MANET regions typically works well. That's because at any particular hop along a route, only the next hop is relevant—merely moving in the general direction of the ultimate destination is adequate. As a packet hops its way across the MANET towards its destination, the closer it gets to its destination, the more up-to-date is each forwarding node's notion of the topology along the remaining portion of the route to that destination. The fisheye conjecture states that the more distant the final destination, the less up-to-date and accurate need be the knowledge of the MANET topology near that distant destination to successfully route to it.

This realization may allow for improvement in the efficiency and scalability of OLSR TC messaging by intentionally limiting TC emission frequency and distribution range, in order to improve TC scaling. Adopting this approach causes each node's notion of distant topology becoming even more out-of-date than when using standard OLSR. Two efficiency enhancements are available: reducing message emission frequency and using TTL (time to live, or maximum hop-count) to limit message distribution range. In each case, the timeout period for each node's route entries must be increased commensurately as the distance to a destination increases. Note that these two approaches reinforce and compound each other's scaling benefit.

Using TTL to Limit TC Message Distribution Range

Standard OLSR TC messages already include a TTL mechanism to preclude any possibility that TC messages may cycle endlessly through the MANET. One way this might happen is by the size of the duplicate cache being exceeded while MANET topology changes. The OLSR standard recommends a TTL value 255 for TC messages. The present idea is to further reduce the TTL value to minimize TC message distribution range. This may substantially reduce aggregate TC message retransmissions, especially when MANET diameter is large—the larger the diameter, the greater the TC retransmission reduction. Note that this reduction may scale super-linearly on average, and may provide the greatest benefit exactly where it is most needed, in large-diameter IM.

In standard OLSR, every node knows its local 2-hop neighborhood topology via HELLO messaging. That means TC messaging is only useful for sharing topology information more distantly. In other words, to be of any appreciable benefit, the TTL value must be greater than 2. TC TTL values can be drawn from a stochastic distribution ranging from 3 to 255 and truncated/clipped a bit above the approximate diameter of the MANET. An inverse logistic function is an attractive possibility for the TTL stochastic distribution.

Reducing TC Message Emission Frequency

Since the primary purpose of TC messaging is to distribute current local topology information across the MANET, how often TC messages are emitted should be, ideally, tied to how quickly and how much local topology is changing. Changes in the TC-emitting-node's MPR Selector set drive local OLSR MPR-spanning-tree topology change, and thus can also be used to drive TC emission rate.

It may also be beneficial for a node to distribute only MPR Selector set deltas (changes) most of the time, and only occasionally distribute its full MPR Selector set and T2 association set.

There are two constructive purposes for continued TC messaging when the local topology information contained in those messages hasn't changed—to supply new nodes joining the MANET with routing information, and because MANET messaging is unreliable, prior info may have not been received.

In standard OLSR, when a new node joins the MANET, it must slowly build up its topology and routing tables from scratch based upon HELLO, TC, and HNA messages received. This may require every node to continue generating TC messages on an ongoing basis, even when no change has occurred over a long period. A more efficient approach is for a new node joining an established MANET to bootstrap its routing table by copying a 1-hop-neighbor's topology table, and then compute its routing table based upon the copied topology table and its observed 1-hop neighbors. Note that this may "boot" these tables much faster, and takes a step towards freeing nodes whose local topology remains unchanged from the burden of continuing to transmit frequent TC messages.

Taken together, the approaches discussed in this section may significantly contribute to dramatically improving TC message scaling, and more generally OLSR scaling.

Scaling TC Messaging: Far-Ranging Routes and Route Direction

In the previous section on "Scaling TC Messaging: Hop-Count and Emission Rate," the tacit assumption was made that, most of the time, changes in the topology of distant regions of the MANET (many hops away) may result in no meaningful changes to a node's routing table. Recall a node's routing table includes of (destination, next hop) pairs encoding the next hop to be taken to move a directed unicast packet toward its final destination.

This tacit assumption is not always true—occasionally a distant link-state change can cause modifications, even massive modifications, to a nodes' routing table. This is termed a link-state change that is far ranging. Note that far ranging link changes can invalidate the fisheye conjecture.

When is a link-state change far ranging? When it dramatically alters the distance to a region of the MANET, as perceived by the nodes at either end of the changed link. Conceptually, there may be two cases. First, a direct connection is made to one or more distant nodes—a distant region becomes close. Second, the loss of a direct connection causes one or more near nodes to become distant—a close region becomes distant.

From the point of view of a node relatively distant from both ends of the changed link, the next-hop direction of a collection of distant nodes may have changed—in the extreme, the new direction can be directly opposite the old direction. That change in direction manifests as route-table changes—the next hops to some set of distant nodes changes.

So what do far-ranging link-state change and route-direction change mean as a practical matter for IM? It is expected that a strong correlation will exist between how far-ranging a link-state change is, and how far its resulting route-direction-changes radiate.

If this conjecture proves true (to be determined), it means the two nodes participating in a link-state change (the nodes on either end of the changing link) can use that correlation to guide them in setting the TTL and emission frequency of their TC messages used to distribute the corresponding link-change information. The intent is to have the magnitude of the topology change dictate the range and frequency of the corresponding TC message distribution.

In addition, it may be of benefit to add some hysteresis to an intermittent far-ranging link—requiring it to be stable for some period before counting it as present. This may prevent massive whipsawing of large numbers of routes. Note that, from the perspective of a node distant from both ends of the changed link, a node contemplating the possibility of changes to its routing table, merely changing the "distance" to a destination doesn't necessarily imply a routing direction change to any node in its routing table because the next-hop "direction" may remain unchanged.

Sometimes, a TC message containing relevant route-table-changing information may fail to reach one or more desired recipients, recipients whose route tables would change when receiving the TC message. Even in this case, as long as the old route direction is still close to correct (e.g., not opposite to the new correct direction), it is expected that other nodes along the old route may often "correct" the tail of a packet's path, resulting in a sub-optimal but working route. This is also true, but possibly to a lesser extent, in standard OLSR.

Overall, it is expected that using far-ranging link-state change to drive emission of far-ranging TC messages (i.e., TC messages having high TTL) may allow significantly improved scaling without significant loss in routing accuracy—necessary to scale IM to very large numbers of nodes. In other words, this should help improve OLSR scaling while minimizing routing performance degradation.

Other OLSR Scaling Improvements

Other opportunities to improve OLSR efficiency and scaling may be possible.

OLSR and DTMA Cooperation: Cross-Layer Optimization

The core DTMA is designed to keep each locale's T1 membership within the desired T1 occupancy window independent of what else may be happening in the locale. This allows other IM algorithms to modify tier membership without having to worry too much about maintaining the desired T1 occupancy window. In effect, maintaining the desired T1 occupancy window is a service DTMA provides.

In particular, other algorithms can focus on achieving their performance goals, for example, by promoting selected T2 nodes to T1 status, without the burden of also dealing with maintaining the desired T1 occupancy window. In this section, an approach is described on how some of these other algorithms can work cooperatively with DTMA to boost overall IM performance.

Maximize Backbone Stability

It may be possible to bias T1 node selection towards nodes having more stable links to 1-hop T1 neighbors, or conversely, avoid T1 nodes whose 1-hop-T1-neighbor links are less stable or support lower data rates.

IM OLSR runs only on the backbone. Having a more-stable backbone (T1) topology should translate into improved IM performance. First, when MPR spanning trees change due to T1-to-T1 link changes and/or MPR selection changes, traffic can "fall through the cracks" during the changeover. Fewer backbone topology changes may mean less traffic will be lost during changeovers. Second, fewer backbone topology changes mean fewer TC messages need be created to distribute updated topology information—OLSR and TC messaging can be made more efficient.

Making T1 MPR

IM OLSR runs only on the backbone. OLSR may create MPR spanning trees that span the backbone. However, backbone leaves in these MPR spanning trees may have T2 nodes dependent upon them to receive OLSR-efficient-flooded, multicast, and directed traffic. That means OLSR must be modified to run on the backbone. Any T1 node may have one or more T2 nodes that have backbone connectivity only through that T1 node. The simplest way to deal with this issue is to assume that every T1 node has been selected as an MPR by a T2 node, that is to say, every T1 node can consider itself an MPR and therefore distributes TC messages. Other approaches may be used, as will be appreciated by those skilled in the art.

Foster Shorter Routes Via Topology Connectors

Another area where interaction and/or cooperation between OLSR and DTMA may be beneficial is to adjust backbone topology to minimize route length. This might be accomplished by biasing T1-node selection toward fostering shortest-path routing via the backbone. Another way to think of this is that the MANET wants to avoid a node having a 2-hop neighbor with no intervening T1 node to that 2-hop neighbor.

Figure 8:
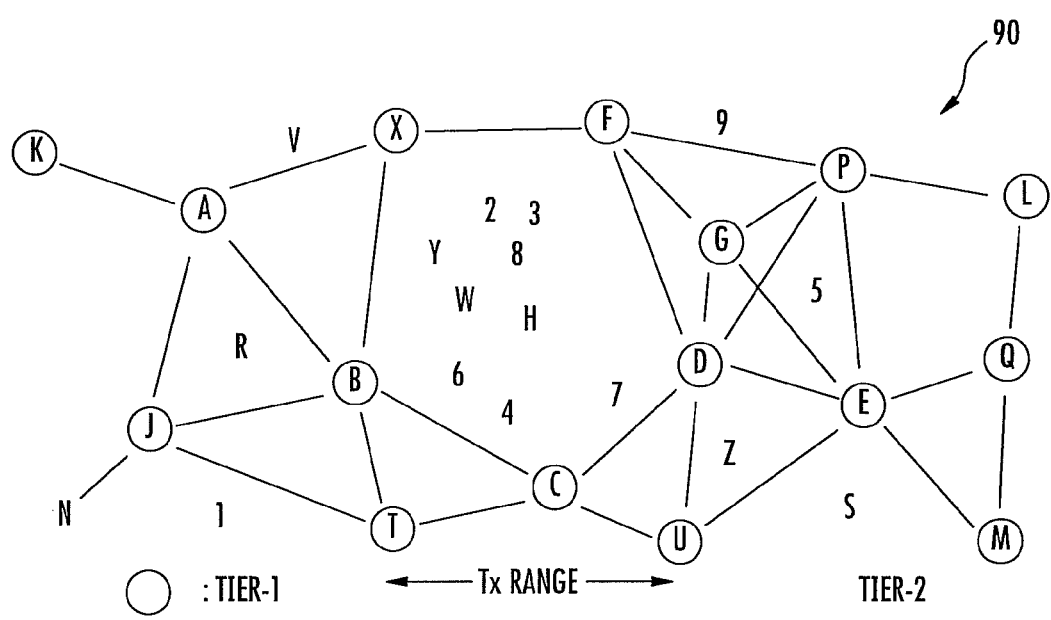
Figure 9:
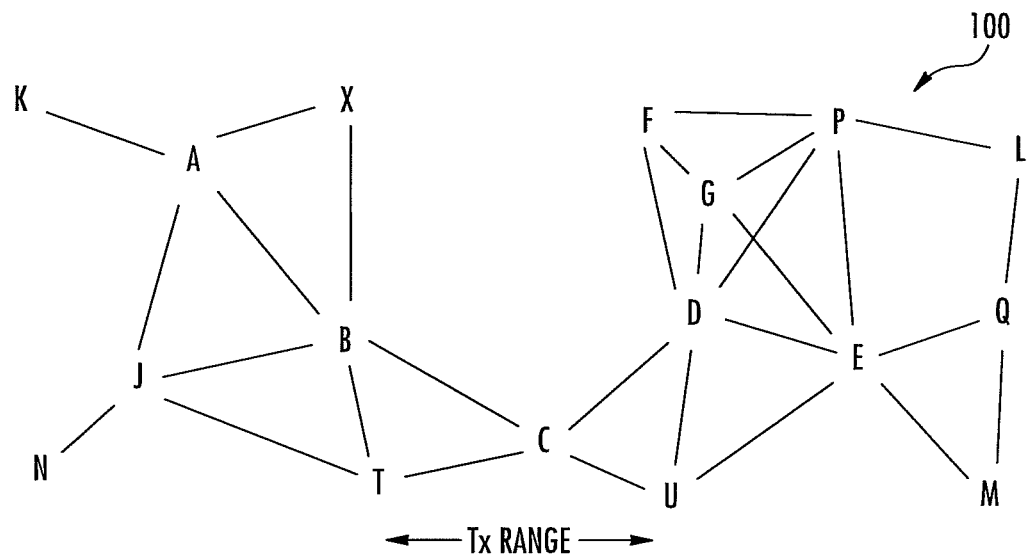
Figure 10:
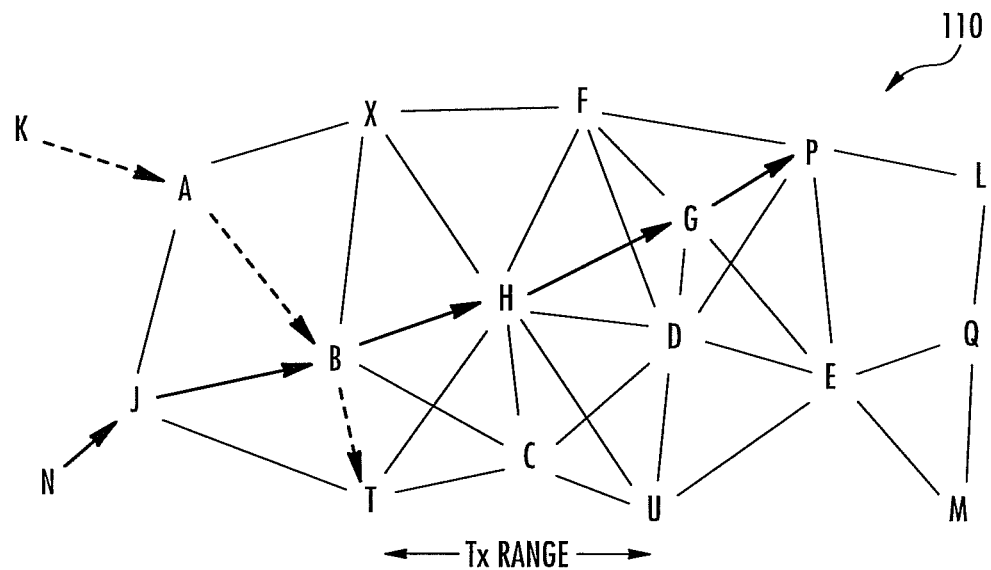
Figure 11:
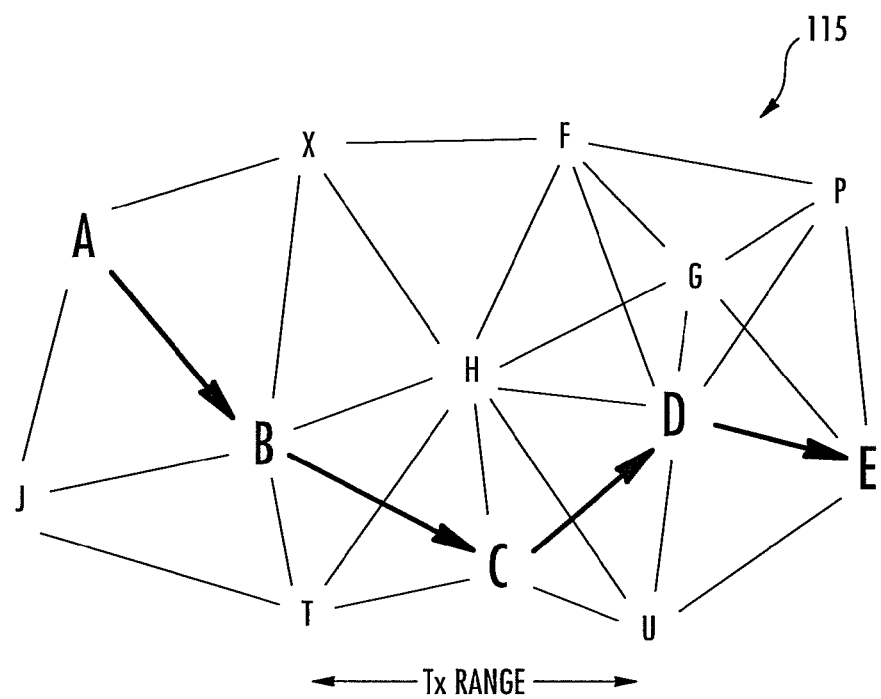

Referring to FIG. 8, a slice topology diagram 90 illustrates the MANET 20 before H is promoted to tier one as a topology connector as shown in diagram 45 FIG. 3. FIG. 8, diagram 90 is identical to the slice topology diagram 45 FIG. 3, but here node H belongs to tier two instead of tier one. Note that nodes B and G are now three backbone hops apart, even though they are two-hop neighbors. By promoting node H to tier one, nodes B and G reduce their separation to only two hops, as shown in FIG. 3, one hop transmitted at the T2 source node and the other transmitted at a T1 backbone node.

This idea can be stated more precisely as follows. A T2 node, when detecting it has the ability to reduce the topological distance between two of its 1-hop neighbors as reckoned by backbone routing, may probabilistically promote itself to T1 status to more-closely connect those nodes via the shorter path (through the new T1 node). This can be conceptualized as adjusting MANET topology to minimize the average distance between any two randomly selected nodes in the MANET. Yet another way to think about this is promoting T2 nodes to T1 status to be topology connectors.

Notice the relationship between far-ranging link changes and topology connectors—far-ranging link changes only occur when topology connectors are promoted to T1 status.

Re-Mediating Hot Spots

A hot spot is any place in the MANET where data traffic exceeds transmit capacity, or is in danger of exceeding it. For example, when two isochronous streams cross, the crossing node's transmit channel time may be insufficient to forward the amount of routed traffic for both streams. Hot spots can occur due to (at least) the following reasons.

1. Topology constraints: Occurs when MANET topology constricts to a pinch point. Extreme examples include barbell topologies, where two lobes of densely connected nodes are connected by a single node, a line of nodes, or a small set of nodes. In the IM backbone slice topology diagram 100 shown in FIG. 9, node C is a topological pinch point connecting two network lobes.

2. Routing artifacts: OLSR routes in a reverse direction through a destination's MPR spanning tree. At the tail end of routes to a particular destination, this results in many routes being funneled through the relatively few nodes closest to the destination—the closer to the destination, the fewer the number of nodes that incoming routes flow through. Thus, if many nodes generate sufficient traffic to some single destination, for example, a gateway or server, congestion can arise in the forwarding nodes near that destination. This scenario may be called an "all routes lead to Rome" congestion cloud.

3. Crossing flows: When fat traffic flows cross, a hot spot can be created where the flows overlap at the cross-point node. These can be thought of as virtual hot spots, since they are not induced directly by MANET topology constraints. As an example, consider the two video streams, originated at nodes K to T and flowing to destination nodes N to P, crossing at node B, shown in the slice topology diagram 110 of FIG. 10; a virtual hot spot may be created at node B. Hot spots may be remediated in several ways. The most straightforward approach is to use IM's robust dynamic channel-time allocation capability to allocate multiple TDMA slots to T1-node B.

Hot spots may also be ameliorated by local load balancing—modifying routes locally to share the pinch-point traffic load among multiple adjacent nodes. Note that cooperation from DTMA may be helpful; when no well-placed T1 node already exists that can share the load, one or more T2 nodes may be promoted to T1 status to be available to help share the load. Promoting those T2 nodes may, in turn, require demoting existing T1 nodes to T2 status to maintain the number of T1 nodes in the locale within the desired T1 occupancy window. This will also require modifying the routing algorithm to make full use of the load-balancing T1 nodes. Note that "Mobile ad-hoc network (MANET) and method for implementing multiple paths for fault tolerance", U.S. Pat. No. 7,742,399 to Pun, assigned to the present application's assignee, the contents of which are incorporated by reference in their entirety, describes a technique that can be adapted for load-balancing purposes.

Another potential approach is to modify the backbone topology to remedy topology-imposed pinch points. For example, it may be possible to remedy the barbell-topology pinch point shown in diagram 100 in FIG. 9, by promoting one or more T2 nodes to provide additional connections between the lobes of the barbell, as shown in diagram 90 in FIG. 8, thereby allowing multiple backbone connector nodes to share the load.

Boosting IM QoS

IM QoS can be boosted by using the flexibility DTMA provides. This will be addressed in the next section covering QoS.

Section 6: IM QoS

QoS is a framework for the successful delivery of real-time isochronous data, end to end, across a potentially unstable data communications network. It uses algorithms, protocols, and techniques to deliver real-time isochronous data streams like voice and video. The term Robust QoS is used to denote a QoS capability for the IM family of protocols, supporting and enabling the successful delivery of real-time data. Robust QoS includes a collection of QoS-enabling technologies, including explicit support for isochronous data streams, dynamic channel time allocation, admission control, traffic policing, distributed MIMO, Express QoS™, and QoS-cognizant routing. The goal is to maintain the efficacy of each throughout the duration of a data stream.

MANET QoS is Challenging

Doing QoS in a wired network has proved challenging but possible. Wireless QoS, particularly in a MANET environment, presents additional challenges. As compared to wired networking, MANET has orders-of-magnitude lower data rates (limited bandwidth) and orders-of-magnitude higher channel noise resulting in orders-of-magnitude higher data-transmission-error rates. MANET radios tend to have limited range (typically line of sight for wideband), rapidly changing network topologies due to node mobility and a dynamic RF channel, and lack explicit on-site provisioning and configuration by knowledgeable personnel because they're ad hoc. Many of these issues can be thought of as the rubber-pipe problem: Data pipe size can change dramatically and quickly. Having only a single communication channel and limited frequencies limits bandwidth. For all these reasons, it is exactly in MANET that QoS is both most needed and most difficult to achieve.

Engineering QoS in a networked radio presents additional complexities and challenges. In particular, red-black security architectures limit QoS control-information flow from red-side application to black-side network and QoS algorithms. In addition, active jamming and LPD/LPI add to the challenge.

ANW2 and QoS

ANW2 currently has limited QoS. ANW2 took a "hard-wired" approach to engineering multi-hop voice QoS by dedicating fixed exclusive-use TDMA slots to voice delivery—the digital voice (DV) epoch interval(s) in every epoch. Two-hop QoS data routing is the primary additional QoS feature incorporated into ANW2. The typical ANW2 allocates, to each node, a beacon slot in the Beacon Interval of the epoch, and a corresponding block of data slots in the Data Interval. For example, the third beacon slot is implicitly paired with third TDMA slot. Each slot contains four data slots, allowing each node to transmit user data to up to four distinct destinations per epoch.

In IM, only T1 backbone nodes are allocated TDMA slots. T2 nodes are not allocated any recurring TDMA slots; rather, they contend for channel time within the contention interval 54. User data can be transmitted in unused parts of an IM beacon. The Data Interval 55 is renamed to Supplemental Interval (SI) because it can contain in-band control data in addition to user data.

Isochronous Data Stream Support Via SIFC

An attractive way to provide explicit support for isochronous data streams in IM is via a Supplemental-Interval Frame Control (SIFC) packet or TLV. In this subsection, this approach is briefly discussed. The idea is to occasionally transmit an optional QoS control packet or TLV, either at the start of a T1 node's TDMA data allocation or in the beacon.

Like the IM beacon, the SIFC packet or TLV is primarily intended to transmit control data describing how a node's data slots may be used going forward, but when control data fails to fill a SIFC packet, user data can be included to fill out the packet.

A SIFC approach to adding explicit IM support for isochronous data streams may have numerous benefits, including the following.
- Low stream initiation latency: less than or equal to one epoch for first-hop initiation
- Robust bandwidth allocation: either already-owned TDMA slots can be used to support startup of a new stream, or additional TDMA slots can be allocated to support high-volume data streams
- High efficiency: once a stream has been initiated, SIFCs need only be transmitted occasionally to extend an isochronous stream's data frame reservations into future epochs
- High reliability: to help insure SIFCs are received, they may be transmitted at lower data rates using a more-robust PHY/radio modulation
- Flexibility: a SIFC can allocate parts of a TDMA slot in mix and match fashion, for example, to different streams and/or different destinations
- Additional flexibility derives from the fact that a single backbone node can, via DTMA, allocate itself multiple TDMA slots, allowing it to handle even more streams and/or fat streams. For example, a backbone node holding two TDMA slots can simultaneously support eight or more isochronous streams at one extreme, or use both slots to support a single high-volume stream or bulk transfer at the other extreme
- Like IM beacon packets, a SIFC packet can contain both control data and user data. This supports higher efficiencies by minimizing the unused partial-slot channel-time remnant following the SIFC TLV in the SIFC packet transmission Express QoS™: ETEL Minimization IM offers an opportunity to deliver significantly lower ETEL for isochronous streams as compared to ANW2. The improvement should be substantial enough to sometimes be noticeable to human users, especially in large-diameter MANET. In Express QoS™, TDMA slot assignments within the epoch are optimized to minimize ETEL. Specifically, the slots belonging to nodes along a stream's route are rearranged to be in ascending time order within the epoch. When this optimization is accomplished, isochronous stream packets can flow across the MANET much faster, making many hops along their route during a single epoch.

A simple example serves to illustrate the Express QoS™ advantage. Consider the IM slice topology diagram 115 shown in FIG. 11. An isochronous data stream is sourced at node A, routed sequentially through nodes B, C, D, and terminates at destination node E.

Figure 12:
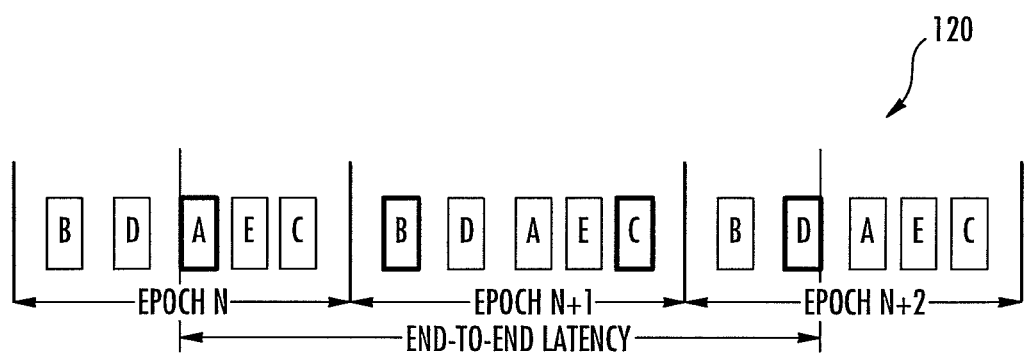
FIG. 12 is a schematic diagram of a possible random TDMA allocation in the MANET of FIG. 1.
Figure 13:
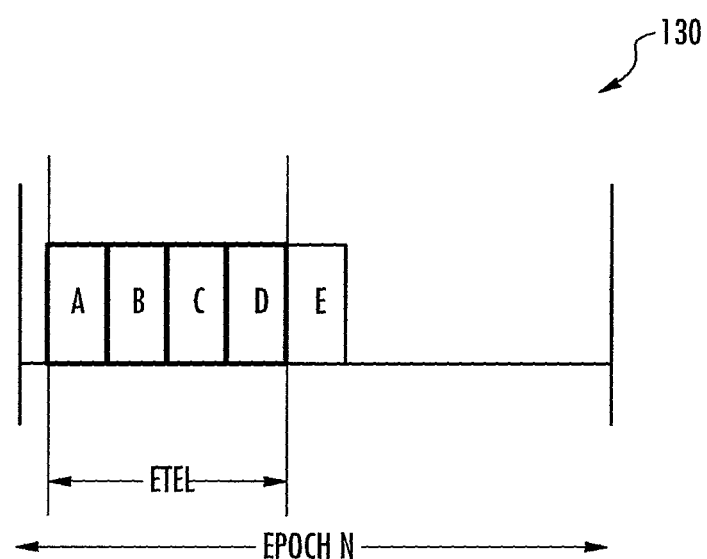
FIG. 13 is a schematic diagram of another embodiment of the TDMA allocations for the MANET of FIG. 1, and in particular, of the nodes along the directed packet route from source node A to destination node E in FIG. 11.

A diagram 120 in FIG. 12 shows a possible random TDMA allocation for the four nodes along the isochronous data stream route running along nodes A, B, C, D, and terminating at destination node E. A single packet's transmission times, as it hops along the stream's route to destination node E, are shown by bold outline. The horizontal axis is time; three epochs are displayed. Note that ETEL is about two epochs. Other random allocations could have higher or lower ETELs, but are likely to average around two epochs. Differently, a diagram 130 in FIG. 13 shows an optimized Express QoS™ TDMA slot allocation for a packet along the same route. The optimized allocation has an ETEL of a fraction of a single epoch. Such ETEL reductions are common with Express QoS™.

The reduction of ETEL may depend upon the number of TDMA slots per epoch and the length of the route. Say the number of TDMA slots per epoch is N. Express QoS™ can deliver up to N hops per epoch along a route each epoch. Random TDMA allocation is likely to deliver something like 1.5 hops per epoch, regardless of how large N is. The larger is N and the longer the route, the greater the reduction in ETEL achieved by Express QoS™.

Consider an example in a MANET with 10 TDMA slots in each epoch. By taking full advantage of Express QoS™, it is possible for each packet to traverse a 10-hop MANET within a single epoch's supplemental interval, and therefore have an ETEL of substantially less than one epoch. Note that this is much lower than the expected latency, when not using Express QoS™, of 6-7 epochs. Thus, Express QoS™ may typically deliver each packet more than 6 to 7 times faster, in terms of ETEL. Applying Express QoS™ to typical ANW2, ETEL is reduced from 1-2 seconds to around 0.1 seconds—a substantial reduction and particularly important in applications like remote UAV piloting or VoIP.

There is currently no mechanism in ANW2 to rearrange/reorder slot allocations in this fashion. One of the great strengths of the IM approach is that IM has the flexibility to facilitate this kind of reordering. The native tier-migration mechanism used by IM can be repurposed to accomplish this reordering and do so rapidly.

Accomplishing Express QoS in IM

In this section, one potential way Express QoS™ might be made to work in IM is described. When an isochronous stream starts, routing is done as usual, startup may be allowed to proceed immediately with the normal high ETEL resulting from non-QoS routing. Some initial sequence of the stream's data packets sent from source to sink will include additional QoS control information—a dynamic hop-count field, probably implemented as a TLV (i.e., using a TLV type of format). This dynamic hop-count can help each node along the route reorder its slot usage to be in accordance with that required by QoS™.

When the originating source node transmits the initial sequence of packets, the dynamic hop-count field's value is set to one in each packet. This denotes the originating source node plans to acquire the first TDMA slot in the epoch and use it, eventually, to transmit the steam's packets on their first hop along the route to their final destination.

At each successive hop's transmission, the dynamic hop-count field's value is incremented, modulo N, plus one, where N is the number of TDMA slots in the epoch. As a result, each node along the route can learn its ideal prospective hop-count-slot position, within the epoch, as the stream's first packet moves along that route. The hop-count-slot position denotes the desired Express-Qos™ TDMA slot ID number at each node along the route.

Each node then works to acquire its optimal TDMA slot for use in forwarding data packets belonging to that isochronous stream—the slot that may minimize ETEL along the stream's route. This can be done in parallel or serially along the route's path. Once each node along the route completes this process, the stream's ETEL will be minimal.

In what follows, the exchange of control information can be direct, ie, 1-hop, when the nodes exchanging information are 1-hop neighbors, or indirect, ie, via a 2-hop path when the nodes are 2-hop neighbors. In addition, each of the two nodes must verify the proposed TDMA slot to be moved to is not already occupied in some third node in each of the two node's respective locales.

Easy TDMA Slot Acquisition

Sometimes (rarely in IM because the desired T1 occupancy window headroom may typically be a small number of nodes—one or two), the desired TDMA slot will be free and can immediately be allocated/acquired.

Harder TDMA Slot Acquisition

More often, the desired TDMA slot will already be occupied by another node in the locale (only TDMA slot allocations within the locale are relevant at each hop). This may require the requester to "bump" the node currently occupying the desired slot. The stream node will request the node currently occupying the desired slot release it to the requester. One way this can be accomplished is by a slot swap—the requester and requestee simply swap slots. This may be a good approach because it reduces the possibility of TDMA slot-allocation collisions.

Hardest TDMA Slot Acquisition

Acquiring the desired TDMA slot can also be accomplished, albeit more slowly, via a two-stage exchange. First, the requestee acquires a new TDMA slot to use in place of the slot to be relinquished. Then the requestee notifies the requestor that the slot is available for the latter's use and simultaneously stops using it (i.e., transmitting in it). At this point, the requestor starts using the desired Express-QoS™ slot and the process completes.

Minimal ETEL

The Express QoS™ thus far seeks to minimize ETEL. After a brief TDMA-slot optimization period, all stream transmission slots along the route will be in consecutive ascending slot-order along the route. For an isochronous video stream, a typical initial ETEL is around 0.67 epochs/hop. Within a relatively short period (a little above the average time for a node to migrate to another beacon slot, plus an additional factor linear in route length), Express-QoS™ ETEL may usually drop to a small fraction of an epoch/hop. The destination user might perceive this as one or two glitches during stream startup depending upon the kind of data being transmitted and the application used.

Desirability of Sub-Optimal ETEL

Sometimes minimum ETEL may not be achievable. This can occur when a needed TDMA slot is not available. For example, the node currently occupying the needed slot in the locale may not relinquish it because the node is using it for a preexisting Express-QoS™ isochronous stream. As a result, shooting for a higher-than-minimal ETEL may be best. For example, allocating two TDMA slot IDs for each hop along the route may give each node some flexibility in acquiring its Express-QoS™ TDMA slot—two chances to succeed—while still allowing slot acquisition to occur rapidly, in parallel, along the route.

In other words, partial Express-QoS™ may be good enough. This is particularly true when the length of the route (number of hops from source to destination) is less than half the number of TDMA slots in the epoch. For example, if the route length is half the number of TDMA slots in the epoch, using, on average, every other slot to sequence Express-QoS™ may still provide ETEL substantially lower than a single epoch. This allows local optimizations to be made along the route by loosening the Express-QoS™ requirement that TDMA slots be in strictly sequential order along the route.

Parallel Versus Sequential

Another option relates to how to setup Express-QoS™, in parallel or sequentially. Thus far, setting up Express-QoS™ in parallel has been described. The in-parallel approach minimizes the time to start the isochronous stream—the time to achieve a low ETE latency. It also minimizes the high-jitter period accompanying the stream startup as each node along the route seeks its most-desirable TDMA slot. However, it can fail to achieve the lowest possible ETE latency, or even a good ETE latency, because the most desirable TDMA slots, or even good TDMA slots, may not be available at some node along the route. When this happens, the TDMA slot chosen by the following node (in a predetermined fashion, recall all TDMA slot acquisitions are being done in parallel) may be highly suboptimal. What counts as a good TDMA slot for one node along the route, depends upon the TDMA slot chosen by the prior node in the route. This is a weakness of the parallel approach.

Another approach is to setup Express-QoS™ sequentially along the route one node at a time, rather than in parallel. The sequential approach achieves the minimum ETE latency, all things considered, based upon which TDMA slots are available, at each node along the route, and which aren't. However, it can have a longer startup period, and potentially high jitter during that period.

In the sequential approach, the first node in along the route (i.e., the source node) moves to the first available TDMA slot in the epoch that it can get (i.e., that is free or that another node in the locale is willing and able to relinquish). Then it signals the second node along the route to proceed to setup its Express-QoS™ TDMA slot, with the goal of acquiring the sequentially next TDMA slot in the epoch. That node then moves to the first available TDMA slot following the source node's Express-QoS™ transmissions. And so on along the entire route.

Parallel Express-QoS™ setup may usually be faster at the cost of higher ETEL. Sequential Express-QoS™ setup may generally produce lower ETEL at the cost of a longer setup time. Hybrid approaches are also possible. For example, parallel setup can be done quickly when the isochronous stream first starts, followed by a longer phase of sequential setup that more slowly optimizes (lowers) ETEL to its lowest achievable value.

QoS Management Entity (QME)

Admission control, traffic policing, QoS negotiation, QoS contract monitoring, and QoS remediation efforts (when IM fails to deliver the contracted level of QoS) can all be handled, architecturally, by including a QoS Management Entity (QME) in each node. These QoS features combine with IM's dynamic channel-time-allocation capability and Express-QoS™ to "cover the QoS bases".

QoS-Cognizant Routing

QoS-cognizant routing, however, is another matter entirely. QoS-cognizant routing uses the standard routing task performed in a multi-hop mesh MANET as a starting point. QoS-cognizant routing then adds a variety of additional route-selection criteria to the routing task. These may include link-state stability (and potentially link-state-stability prediction), link capacity (link bandwidth), the link's transmission queue depth (queue backup) to the dynamic routing task, and achievable ETE latency. These, taken together, can help insure the end-to-end route chosen for a QoS data stream is able to provide the throughput and timeliness requested (negotiated) by the application generating the isochronous data stream QoS request.\

IM

IM may deliver substantial MANET capability, flexibility, and robustness—all useful to users.

Scaling to an arbitrary number of nodes in a single MANET adds additional operational flexibility Robust and rapid dynamic allocation of channel time supports tailoring backbone topology for improved routing, QoS, backbone contiguity, and load balancing Robust and rapid geographic channel-time reuse may substantially increase network throughput in all but small-diameter MANET Faster and more-robust network formation and network merge Much better QoS, including explicit support for isochronous streams, QoS-cognizant routing, low ETEL via the ability to implement Express QoS™, and load balancing Infinite voice relay: Rapid, robust voice relay across an arbitrary number of hops Taken together, these new capabilities, when implemented, may deliver dramatically improved ad-hoc networking and support transformative network-centric tactical endeavors—they may deliver much more of the full promise of tactical MANET.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad hoc network (MANET) comprising:
a plurality of mobile nodes each comprising a wireless transceiver and a controller cooperating therewith and configured to
operate in a geographic area using a time division multiple access (TDMA) protocol and based upon a TDMA epoch including TDMA time slots, and
dynamically divide into a plurality of first type mobile nodes and a plurality of second type mobile nodes based upon a current topologic density in the topologic area relative to a topological density threshold
so that each first type mobile node has a periodic TDMA time slot allocated in the TDMA epoch, and
so that each second type mobile node contends for contention interval TDMA time slots in the TDMA epoch,
periodically detects when the contention interval TDMA time slots are being used, and
selectively changes a rate of detecting based upon a number of adjacent second type mobile nodes.

2. The MANET according to claim 1 wherein said plurality of mobile nodes is configured to dynamically divide so that each second type mobile node has at least one first type mobile node within one hop.

3. The MANET according to claim 1 wherein said plurality of mobile nodes is configured to dynamically divide based upon at least one traffic characteristic.

4. The MANET according to claim 1 wherein said plurality of mobile nodes is configured to dynamically divide based upon a minimum first type mobile node coverage threshold.

5. The MANET according to claim 1 wherein said plurality of mobile nodes is configured to dynamically divide to reserve at least one spare TDMA time slot in the TDMA epoch.

6. The MANET according to claim 1 wherein said plurality of first type mobile nodes is configured to exchange isochronous communication.

7. A mobile ad hoc network (MANET) comprising:
a plurality of mobile nodes each comprising a wireless transceiver and a controller cooperating therewith and configured to
operate in a geographic area using a time division multiple access (TDMA) protocol and based upon a TDMA epoch including TDMA time slots, and
dynamically divide into a plurality of first type mobile nodes exchanging isochronous communication, and a plurality of second type mobile nodes based upon a current topologic density in the topologic area relative to a topological density threshold
so that each first type mobile node has a periodic TDMA time slot allocated in the TDMA epoch, and
so that each second type mobile node contends for contention interval TDMA time slots in the TDMA epoch,
has at least one first type mobile node within one hop,
periodically detects when the contention interval TDMA time slots are being used, and
selectively changes a rate of detecting based upon a number of adjacent second type mobile nodes.

8. The MANET according to claim 7 wherein said plurality of mobile nodes is configured to dynamically divide based upon at least one traffic characteristic.

9. The MANET according to claim 7 wherein said plurality of mobile nodes is configured to dynamically divide based upon a minimum first type mobile node coverage threshold.

10. The MANET according to claim 7 wherein said plurality of mobile nodes is configured to dynamically divide to reserve at least one spare TDMA time slot in the TDMA epoch.

11. A method of communicating in a mobile ad hoc network (MANET) having a plurality of mobile nodes and being in a geographic area, the MANET using a time division multiple access (TDMA) protocol based upon a TDMA epoch including TDMA time slots, the method comprising:
dynamically dividing into a plurality of first type mobile nodes and a plurality of second type mobile nodes based upon a current topologic density in the topologic area relative to a topological density threshold so that each first type mobile node has a periodic TDMA time slot allocated in the TDMA epoch and so that each second type mobile node contends for contention interval TDMA time slots in the TDMA epoch; and
operating each second type mobile node to periodically detect when the contention interval TDMA time slots are being used, and selectively change a rate of detecting based upon a number of adjacent second type mobile nodes.

12. The method according to claim 11 further comprising dynamically dividing so that each second type mobile node has at least one first type mobile node within one hop.

13. The method according to claim 11 further comprising dynamically dividing based upon at least one traffic characteristic.

14. The method according to claim 11 further comprising dynamically dividing based upon a minimum first type mobile node coverage threshold.

15. The method according to claim 11 further comprising dynamically dividing to reserve at least one spare TDMA time slot in the TDMA epoch.

* * * * *